United States Patent
Kinugawa et al.

(10) Patent No.: US 10,865,692 B2
(45) Date of Patent: Dec. 15, 2020

(54) WORKING MACHINE AND COOLING CONTROL SYSTEM FOR THE SAME

(71) Applicant: KUBOTA CORPORATION, Osaka (JP)

(72) Inventors: Ryosuke Kinugawa, Sakai (JP);
Nozomu Minagawa, Sakai (JP);
Hiroshi Tatsumi, Sakai (JP); Keisuke Miura, Sakai (JP); Makoto Noguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 106 days.

(21) Appl. No.: 16/014,330

(22) Filed: Jun. 21, 2018

(65) Prior Publication Data

US 2018/0298805 A1     Oct. 18, 2018

Related U.S. Application Data

(63) Continuation of application No. PCT/JP2016/087354, filed on Dec. 15, 2016.

(51) Int. Cl.
*F16D 35/02* (2006.01)
*F01P 5/04* (2006.01)
*F04D 27/00* (2006.01)

(52) U.S. Cl.
CPC .............. *F01P 5/04* (2013.01); *F04D 27/004* (2013.01); *F16D 35/028* (2013.01);
(Continued)

(58) Field of Classification Search
CPC ..... F16D 35/021; F16D 35/024; F16D 35/028
See application file for complete search history.

(56) References Cited

U.S. PATENT DOCUMENTS

| | | | | |
|---|---|---|---|---|
| 6,807,926 | B2 * | 10/2004 | Shiozaki | ............ F01P 7/042 123/41.12 |
| 8,118,148 | B2 * | 2/2012 | Shiozaki | ............ F01P 7/042 192/58.61 |

(Continued)

FOREIGN PATENT DOCUMENTS

| | | | |
|---|---|---|---|
| JP | 2000-186553 A | 7/2000 |
| JP | 2004-340373 A | 12/2004 |

(Continued)

OTHER PUBLICATIONS

Definition of circuit from cambridgedictionary.com (Year: 2020).*
Defintion of circuit from merriam-webster.com (Year: 2020).*

*Primary Examiner* — Stacey A Fluhart
(74) *Attorney, Agent, or Firm* — Birch, Stewart, Kolasch & Birch, LLP

(57) ABSTRACT

A cooling control system for a working machine includes a fan, a housing to which the fan is attached, a prime mover having an output shall, a rotor to be rotated by a rotating power of the output shaft and to be rotated with the housing by a fluid introduced to a gap formed between the housing and the rotor, a fluid setting circuit to set an introduction amount of the fluid introduced to the gap, and a control device to control the fluid setting circuit to control the fan. The control device includes a setting circuit to set a target rotation speed of the fan based on a responsiveness of an actual rotation speed of the fan at time of changing of the target rotation speed of the fan.

23 Claims, 22 Drawing Sheets

(52) U.S. Cl.
CPC ....... *F01P 2025/36* (2013.01); *F01P 2031/20* (2013.01); *F05B 2260/406* (2013.01); *F05B 2270/706* (2013.01); *F16D 35/024* (2013.01)

(56) References Cited

U.S. PATENT DOCUMENTS

| | | | | |
|---|---|---|---|---|
| 8,868,250 | B2* | 10/2014 | Jensen | G05B 11/16 |
| | | | | 361/676 |
| 2004/0223851 | A1 | 11/2004 | Shiozaki et al. | |
| 2006/0096554 | A1 | 5/2006 | Shiozaki | |
| 2007/0068762 | A1* | 3/2007 | Bhat | F01P 7/042 |
| | | | | 192/58.61 |
| 2009/0062963 | A1 | 3/2009 | Hayashi | |

FOREIGN PATENT DOCUMENTS

| | | |
|---|---|---|
| JP | 2006-112466 A | 4/2006 |
| JP | 2007-255216 A | 10/2007 |
| JP | 2011-32921 A | 2/2011 |
| JP | 2012-122371 A | 6/2012 |
| JP | 2013-113291 A | 6/2013 |
| JP | 2013-160056 A | 8/2013 |

\* cited by examiner

… … … … … … … … … … … … … … … … … … … … … …

WORKING MACHINE AND COOLING CONTROL SYSTEM FOR THE SAME

CROSS-REFERENCE TO RELATED APPLICATIONS

The present application is a continuation application of International Application No. PCT/JP 2016/087354, filed Dec. 15, 2016, which claims priority to Japanese Patent Application No. 2015/252271, filed Dec. 24, 2015, to Japanese Patent Application No. 2015/252272, filed Dec. 24, 2015, to Japanese Patent Application No. 2016/126840, filed Jun. 27, 2016, and to Japanese Patent Application No. 2016/126842, filed Jun. 27, 2016. The contents of these applications are incorporated herein by reference in their entirety.

BACKGROUND OF THE INVENTION

Field of the Invention

The present invention relates to a cooling control system for a working machine and to the working machine.

Discussion of the Background

Japanese Unexamined Patent Application Publication No. 2007-255216 is previously known as a cooling control system for a working machine. The cooling control system for the working machine disclosed in Japanese Unexamined Patent Application Publication No. 2007-255216 includes a control device configured to control a rotation speed of a cooling fan, the cooling, fan being configured to introduce the outside air as the cooling air so as to cool the cooling fluid, a fluid temperature sensor configured to detect the fluid temperature, and an outside temperature sensor configured to detect the outside temperature, calculates a difference between the fluid temperature and the temperature of the outside air. and sets a target rotation speed of the cooling fan in accordance with an extent of the difference. Meanwhile, a technique disclosed in Japanese Unexamined Patent Application Publication No. 2013-113291 is known as an exhaust gas purification device configured to catch the particulate matter contained in exhaust gas that is discharged from a diesel engine with a filter and to regenerate the filter.

SUMMARY OF THE INVENTION

A cooling control system for a working machine of the present invention, includes a fan, a housing to which the fan is attached, a prime mover having an output shaft, a rotor to be rotated by a rotating power of the output shaft and to be rotated with the housing by a fluid introduced to a gap formed between the housing and the rotor, a fluid setting circuit to set an introduction amount of the fluid introduced to the gap, and a control device to control the fluid setting circuit to control the fan. The control device includes a setting circuit to set a target rotation speed of the fan based on a responsiveness of an actual rotation speed of the fan at time of changing of the target rotation speed of the fan.

A cooling control system for a working machine, includes a prime mover having an output shaft, a fan to be rotated by a rotating force of the output shaft, a first detecting device to detect an actual revolution speed of the prime mover, a second detecting device to detect an actual rotation speed of the fan, and a control device including a proportional control circuit to perform a proportional control of a difference between the actual rotation speed of the fan and a target rotation speed, an integral control circuit to perform an integral control of the difference, a differential control circuit to perform a differential control of the difference, and a changing circuit to change the controls alternately based on a state of either one of the prime mover and the fan, the controls including the proportional control, the integral control, and the differential control.

A cooling control system for a working machine, includes a prime mover having an output shaft, a fan to be rotated by a rotating force of the output shaft, a first detecting device to detect an actual rotation speed of the fan, an interpolation-trajectory setting circuit to set an interpolation-trajectory based on a target rotation speed of the fan and a polynomial interpolation equation, the interpolation-trajectory extending to the target rotation speed of the fan, and a control circuit to control an actual rotation speed of the fan based on the interpolation-trajectory set by the interpolation-trajectory setting circuit until the actual rotation speed of the fan reaches the target rotation speed of the fan.

A cooling control system for a working machine, includes an electric motor, a fan to be rotated by a rotating force of the electric motor, a first detecting device to detect an actual rotation speed of the fan, an interpolation-trajectory setting circuit to set an interpolation-trajectory based on a target rotation speed of the fan and a polynomial interpolation equation, the interpolation-trajectory extending to the target rotation speed of the fan, and a control circuit to control an actual rotation speed of the fan based on the interpolation-trajectory set by the interpolation-trajectory setting part until the actual rotation speed of the fan reaches the target rotation speed of the fan.

A working machine of the present invention includes the cooling control system for the working machine mentioned above.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
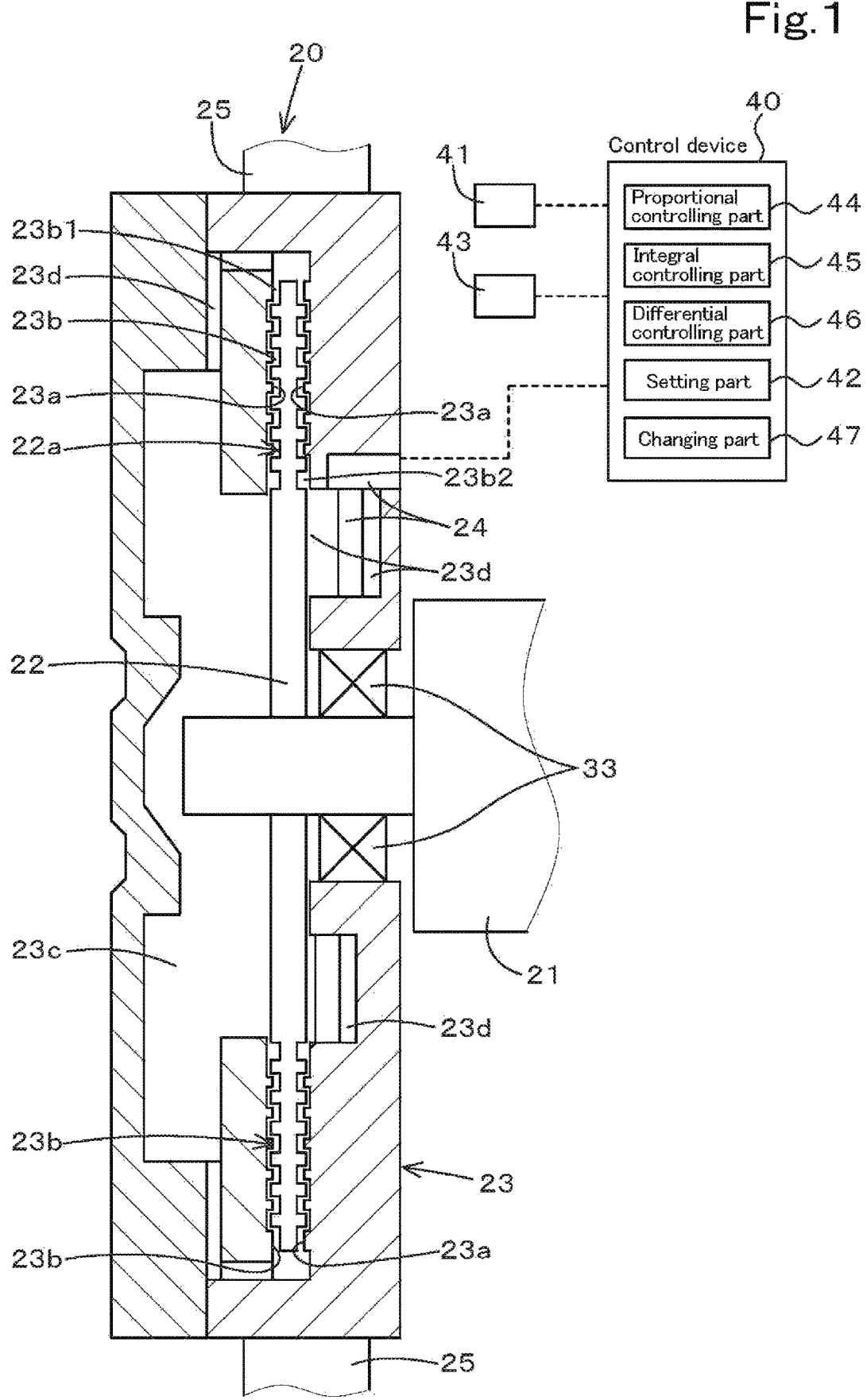
FIG. 1 is a view illustrating a cooling control system for a working machine according to a first embodiment of the present invention.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

First Embodiment

Referring to drawings appropriately, preferred embodiments of a cooling control system for a working machine and the working machine having the cooling control system according to the present invention will be described below.

Figure 19:
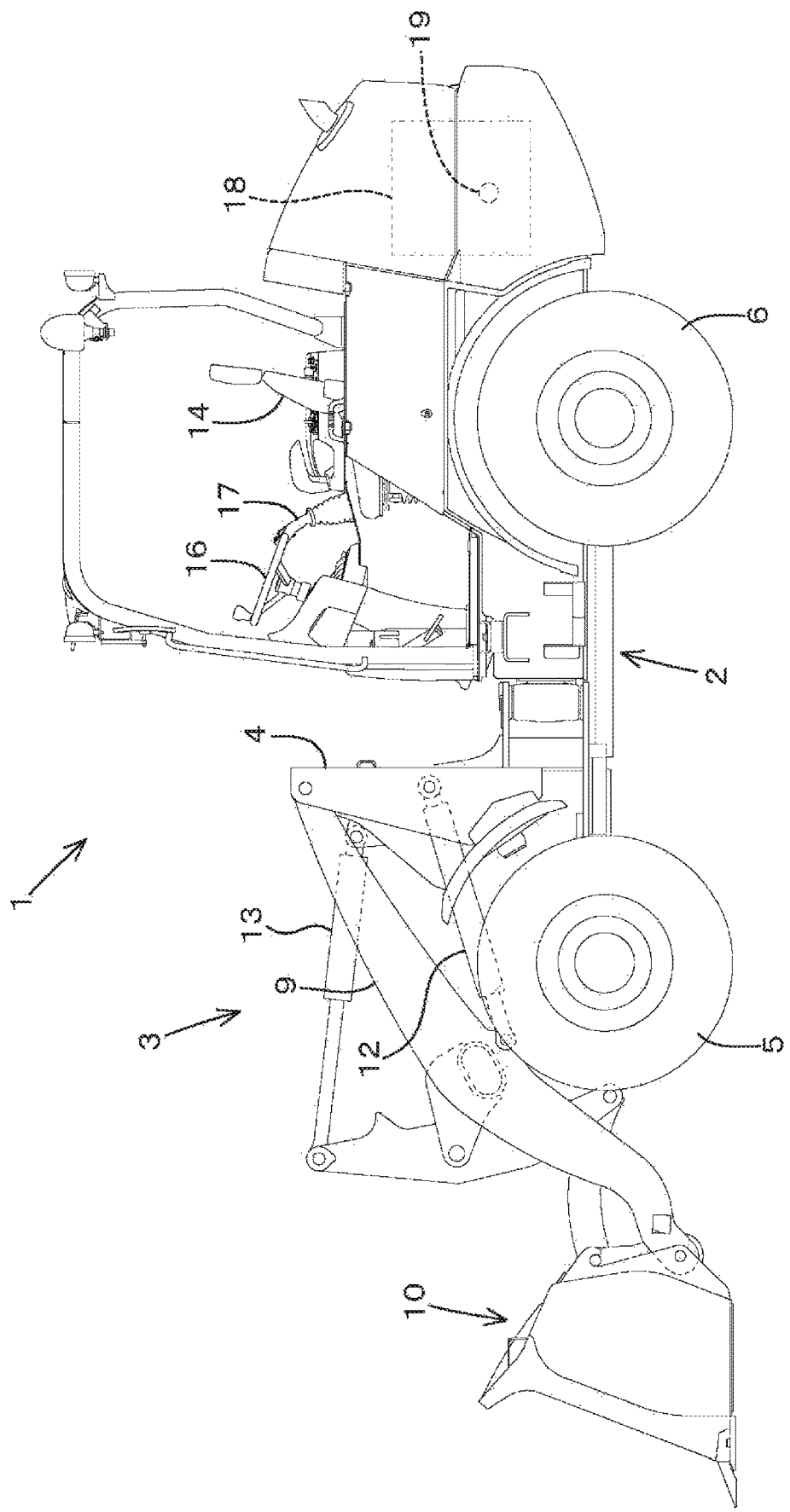
FIG. 19 is a whole view illustrating a wheel loader according to the embodiments of the present invention.

FIG. 19 is an overall view of a wheel loader.

Firstly, the wheel loader is explained as an example of a working machine. Meanwhile, the working machine is not limited to the wheel loader, and may be a compact trajectory loader, a skid steer loader, a backhoe, and the like, or other working machines.

As shown in FIG. 19, the wheel loader 1 is a working machine of an articulated type, and includes a machine body 2 and a working device 3 configured to be operated in the front. The machine body 2 is provided with a front wheel 5 and a rear wheel 6. The machine body 2 is provided with a support frame 4. The working device 3 has a lift arm 9 and a bucket 10. The base end side of the lift arm 9 is supported on the support frame 4, and is configured to be swung about the axial center (a horizontal axis) in a width direction. The lift arm 9 is actuated by the stretching and shortening of the lift cylinder 12. That is, when the lift cylinder 12 is stretched and shortened, the lift arm 9 is swung upward and downward. The bucket 10 is supported on the tip end side of the lift arm 9, and is configured to be swung about the horizontal axis. The bucket 10 is turned upward and downward by the stretching and shortening of the bucket cylinder 13. Meanwhile, the bucket 10 is detachably provided, and in place of the bucket 10, an auxiliary attachment such as a sweeper, a mower, a breaker, and the like can be attached to the tip end side of the lift arm 9.

The machine body 2 is provided with an operator seat 14, a steering wheel 16, an operation device 17 configured to operate the working device 3, and a prime mover 18. The prime mover 18 is a diesel engine (an engine). Meanwhile, it should be noted that the prime mover 18 may be an electric motor or may be constituted of both of the electric motor and the engine. The wheel loader 1 is provided with a hydraulic pump configured to be operated by the rotating power of an output shaft 19 of the prime mover 18. The hydraulic pump is configured to supply an operation fluid to a hydraulic actuator (a lift cylinder 12, a bucket cylinder 13, and the like) mounted on the wheel loader 1 and to a hydraulic actuator of an attachment mounted instead of the bucket 10. In addition, the wheel loader 1 is provided with a traveling device such as an HST (a hydrostatic transmission).

Next, a cooling control system for a working machine provided in the wheel loader 1 will be described below.

Figure 2:
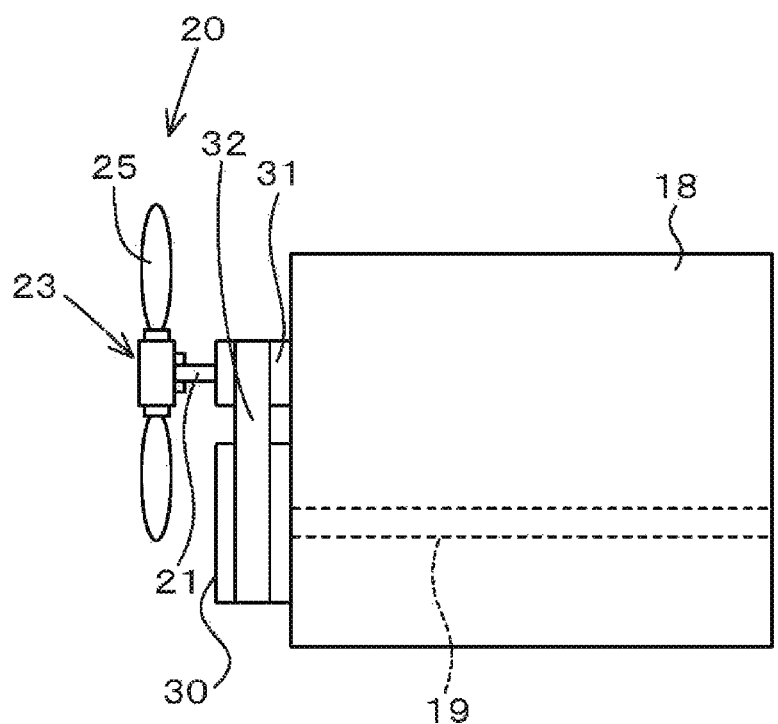
FIG. 2 is a view illustrating a relation between an engine and a cooling device according to the first embodiment.

As shown in FIG. 1 and FIG. 2, the cooling control system for the working machine is provided with a cooling device 20. The cooling device 20 is a device configured to drive the prime mover 18 as a power source, and is a viscous type clutch fan using a viscous fluid. The cooling device 20 includes a rotating shaft 21, a rotor 22, a housing (a case) 23, a fluid setting part (a fluid setting device) 24, and a fan 25.

The rotating shaft 21 is a shaft configured to be rotated by the rotating power of an output shaft 19 of the engine 18. For example, a pulley 30 configured to be rotated together with the output shaft 19 is provided on the output shaft 19 of the engine 18. In addition, a pulley 31 configured to be rotated together with the rotating shaft 21 is also provided on the rotating shaft 21. A belt (a drive belt) 32 is hung on the pulley 30 and the pulley 31, and the rotating power of the pulley 30 is transmitted to the pulley 31 through the drive belt 32. That is, the rotating shaft 21 is rotated by the rotating power of the output shaft 19 of the engine 18.

The rotor 22 is fixed to the rotating shaft 21, and is configured to be rotated together with the rotating shaft 21. The rotor 22 is formed in a disk shape, and has an annular labyrinth portion (a groove portion) 22a on the outer surface of the rotor 22. The rotor 22 is housed in the housing 23.

The housing 23 is supported on the rotating shaft 21 by a bearing 33, and is configured to be rotated. On the outside of the housing 23, a fan 25 having a plurality of blades is attached. Thus, the rotating of the housing 23 rotates the fan 25.

The housing 23 has a wall portion 23a close to the labyrinth portion 22a of the rotor 22. A gap (an operation gap) 23b is formed between the wall portion 23a of the housing 23 and the labyrinth portion 22a of the rotor 22. By introducing a viscous fluid (for example, a silicon oil) into the gap 23b, the rotating power of the rotor 22 is transmitted to the housing 23. The housing 23 is rotated by the rotating power of the rotor 22.

The housing 23 has a storage chamber 23c and a flow path (also referred to as a fluid tube) 23d. The storage chamber 23c is a chamber configured to temporarily store the silicone oil, and is provided on the tip end side of the rotating shaft 21. The fluid tube 23d is a circulation type flow path configured to communicate the storage chamber 23c and the gap 23b with each other. That is, the fluid tube 23d is a flow path connecting, the storage chamber 23c to an outlet side 23b1 of the gap 23b and connecting the storage chamber 23c to the inlet side 23b2 of the gap 23b. Thus, the silicone oil introduced into the gap 23b enters the storage chamber 23c through the fluid tube 23d, then enters the fluid tube 23d from the storage chamber 23c, and thereby returns to the gap 23b.

The fluid setting part (the fluid setting device) 24 is a device configured to set the introduction amount of the silicone oil to be introduced into the gap 23b. The fluid setting device 24 is a solenoid valve configured to close the middle portion of the fluid tube 23d. That is, the fluid setting device 24 has a coil (a solenoid), a pin movable by magnetization of the coil, and a valve body provided at the tip end of the pin. The pin and the valve body of the fluid setting device 24 are provided in the fluid tube 23d, and is configured to open and close the inside of the fluid tube 23d with the movement of the pin. When the aperture of the fluid tube 23d is changed by operating the fluid setting device 24, it is possible to adjust the introduction amount introduced to the gap 23b through the fluid setting device 24 from the storage chamber 23c.

The silicone oil entering the gap 23b passes through the fluid tube 23d and then enters the storage chamber 23c. Here, in a state in which the fluid tube 23d is completely closed by the fluid setting part 24, the silicone oil cannot flow into the gap 23b from the storage chamber 23. When the valve body of the fluid setting part 24 is opened, the silicone oil in the storage chamber 23c passes through the fluid setting part 24, and then can flow into the gap 23b. The rotation speed of the fan 25 (the housing 23) can be changed by the introduction amount of the silicon oil introduced into the gap 23b.

For example, by increasing the introduction amount of the silicon oil introduced into the gap 23b, a real rotation speed (an actual rotation speed) of the fan 25 is increased until the actual rotation speed substantially reaches a real revolution speed (an actual revolution speed) of the engine 18. In addition, by reducing the introduction amount of the silicon oil introduced into the gap 23b, the torque transmitted from the rotating shaft 19 of the engine 18 to the housing 23 through the rotor 22 is reduced. That is, by reducing the introduction amount of the silicon oil introduced into the gap 23b, the ratio of the actual rotation speed of the fan 25 is reduced with respect to the actual revolution speed of the engine 18.

The control of the cooling device 20 is performed by a control device 40 constituted of a CPU or the like. The control device 40 controls the rotation speed of the fan 25 by outputting a control signal to the fluid setting device 24 to change the aperture degree of the fluid setting device 24. That is, the control device 40 controls the fluid setting device 24 so that a target rotation speed of the fan 25 and the actual rotation speed of the fan 25 become the same with each other.

Figure 3:
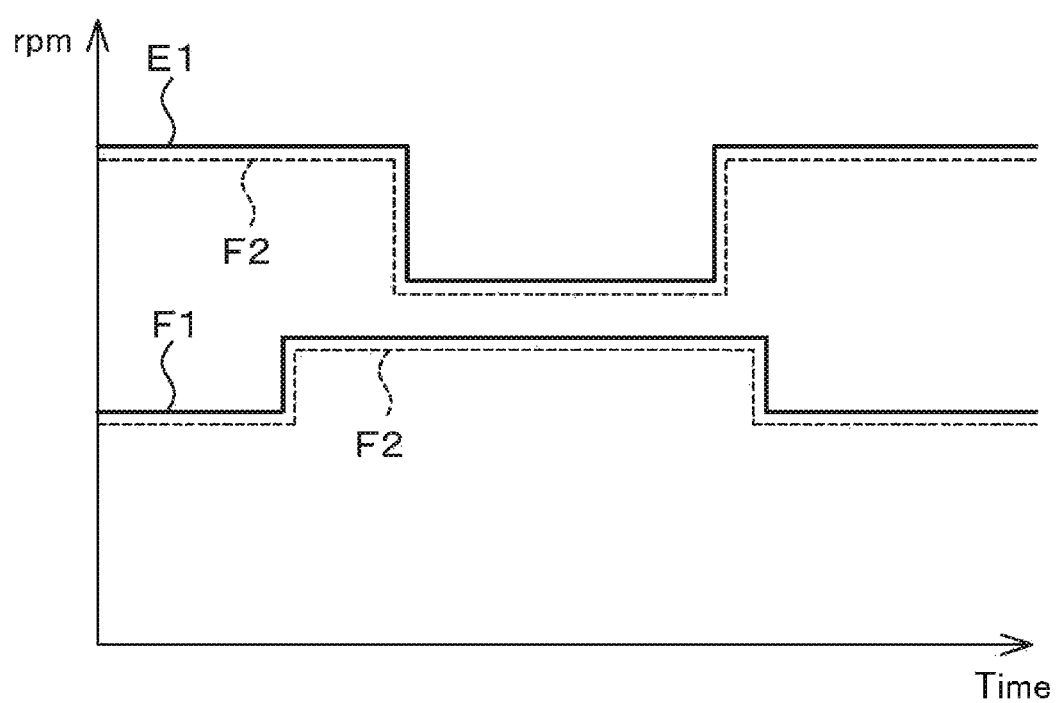
FIG. 3 is a view illustrating one example of a relation between a target rotation speed of a fan an actual rotation speed of the fan, and an actual rotation speed of the engine according to the first embodiment.

FIG. 3 shows an example of a relation between the target rotation speed of the fan, the actual rotation speed of the fan, and the actual revolution speed of the engine. As shown in FIG. 3, when the target rotation speed F1 of the fan is changed, it is ideal that the actual rotation speed F2 of the fan is changed following the target rotation speed F1 of the fan even though the actual revolution speed E1 of the engine is variable. However, as described above, the viscous type clutch fan may generate a stuck state where the actual rotation speed F2 of the fan is changed following the actual revolution speed E1 of the engine despite the state in which the target rotation speed F1 of the fan is changed. And then, the actual rotation speed F2 of the fan does not respond to the target rotation speed F1 of the fan. That is, there may be a case where the responsiveness of the actual rotation speed of the fan is not good at the time of changing the target rotation speed of the fan.

The control device 40 performs a processing (a responsiveness improvement processing) for improving the responsiveness of the actual rotation speed of the fan at the time of changing the target rotation speed of the fan. The responsiveness improvement processing, that is, suppression of the sticking phenomenon will be described below in detail.

The control device 40 includes a first detecting device 41 and a setting, part 42. The first detecting device 41 is a device configured to detect the actual revolution speed (the real revolution speed) of the engine 18. That is, the first detecting device 41 is provided in the vicinity of the output shaft 19, and is configured to detect the actual revolution speed of the output shaft 19 of the engine 18. The setting part 42 is a portion configured to perform the responsiveness improvement processing, and is constituted of electric/electronic parts constituting the control device 40, programs incorporated in the control device 40, and the like. The setting part 42 sets the target rotation speed of the fan to be lower than the actual revolution speed of the engine in advance, and thereby improve the responsiveness of the actual rotation speed of the fan at the time of changing the target rotation speed of the fan.

In particular, the setting part 42 sets a value obtained by subtracting a predetermined speed of the rotating from the actual revolution speed of the engine as the target rotation speed of the fan, the predetermined speed of the rotating being determined on the basis of responsiveness. That is, the setting part 42 sets [the target rotation speed F1 (rpm) of the fan=the actual revolution speed E1 (rpm)−the predetermined revolution speed (rpm) of the engine]. Here, the predetermined rotation speed is a rotation speed determined on the basis of responsiveness, and is a rotation speed (the sticking-prevention rotation speed) at which the sticking phenomenon can be suppressed. The predetermined rotation speed is a value determined by various experiments or the like. And, at least by lowering the target rotation speed F1 of the fan by 150 rpm than the actual revolution speed E1 of the engine, the responsiveness of the actual rotation speed of the fan is improved in the changing of the target rotation speed of the fan.

Figure 4A:
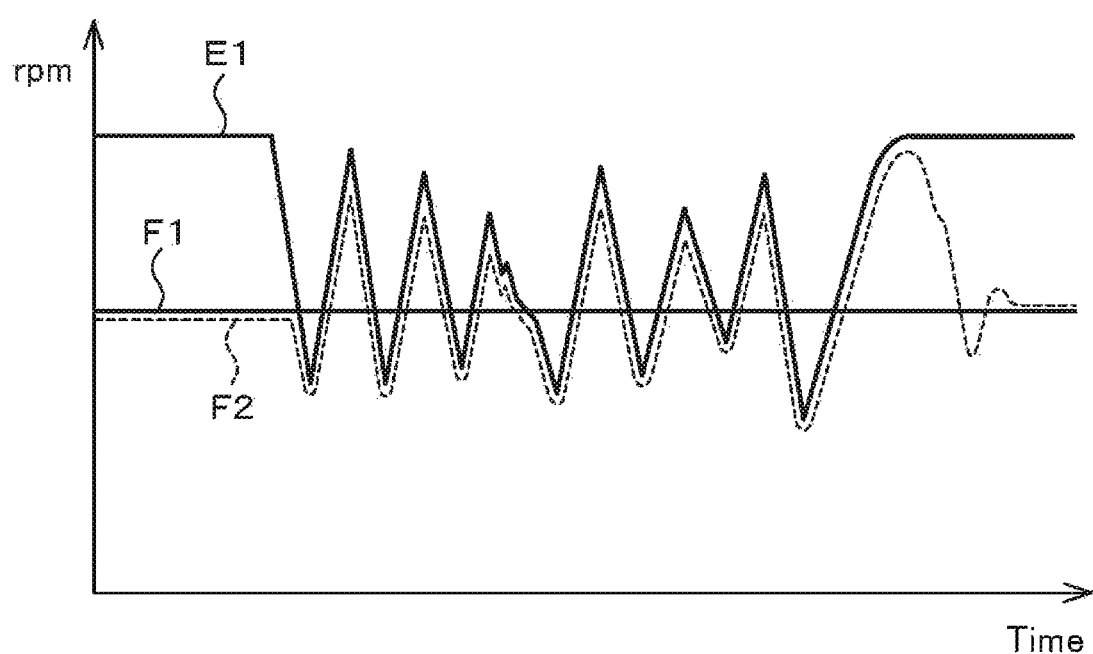
FIG. 4A is a view illustrating a test result of a case where a responsiveness-improving process is not applied to the rotation speed of the fan according to the first embodiment.
Figure 4B:
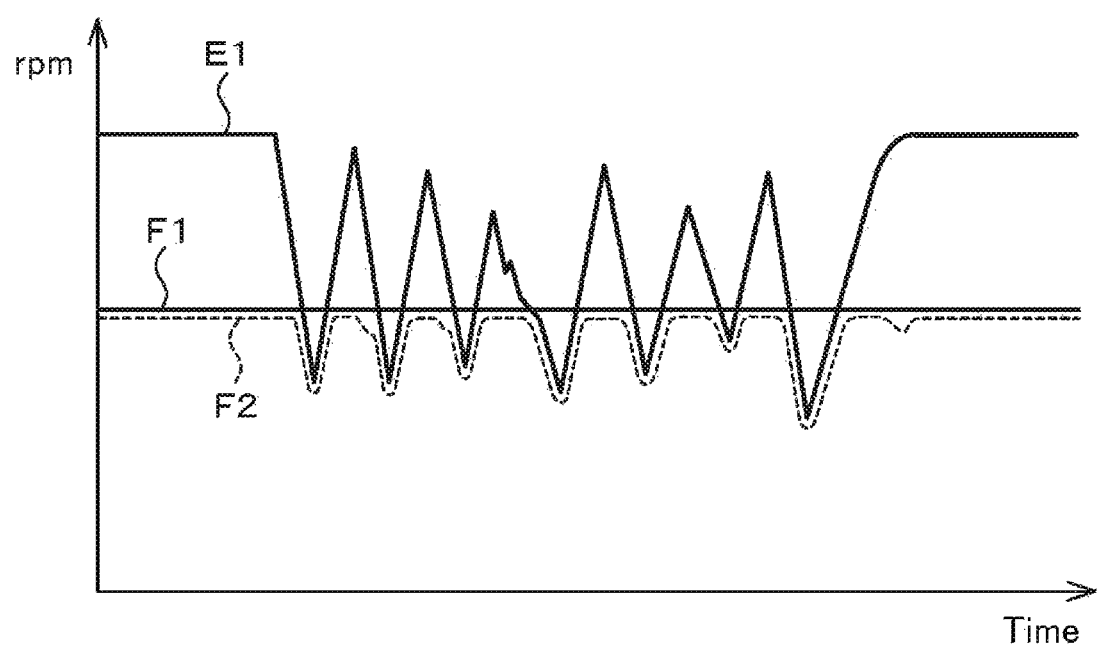
FIG. 4B is a view illustrating a test result of a case where a responsiveness-improving process is applied to the rotation speed of the fan according to the first embodiment.

FIG. 4A and FIG. 4B compare the test results of the case where the responsiveness improvement processing is performed for the rotation speed of the fan to the test results of the case where the responsiveness improvement processing is not performed. Both of the tests are carried out under an identical conditions. In the tests, after the actual revolution speed of the engine is suddenly decreased, the actual revolution speed of the engine was changed in a short time. As shown in FIG. 4A, when the responsiveness improvement processing is not performed. the actual rotation speed F2 of the fan followed the actual revolution speed E1 of the engine. In addition, the hunting occurred when the actual rotation speed of the fan reached near the target rotation speed F1 of the fan. On the other hand as shown in FIG. 4B, when the response improvement process is performed, the actual rotation speed F2 of the fan did not follow the actual revolution speed E1 of the fan, and the actual revolution speed E1 of the fan is substantially equal to the target rotation speed F1 of the fan, thus no hunting occurred.

As shown in FIG. 1, the control device 40 includes a second detecting device 43, a proportional control part 44, an integral control part 45, and a differential control part 46. The second detecting device 43 is a device configured to detect the actual rotation speed of the fan 25 (the housing 23). That is, the second detecting device 43 is provided in the vicinity of the fan 25 or the housing 23, and is configured to detect the actual rotation speed of the fan 25.

Figure 5:
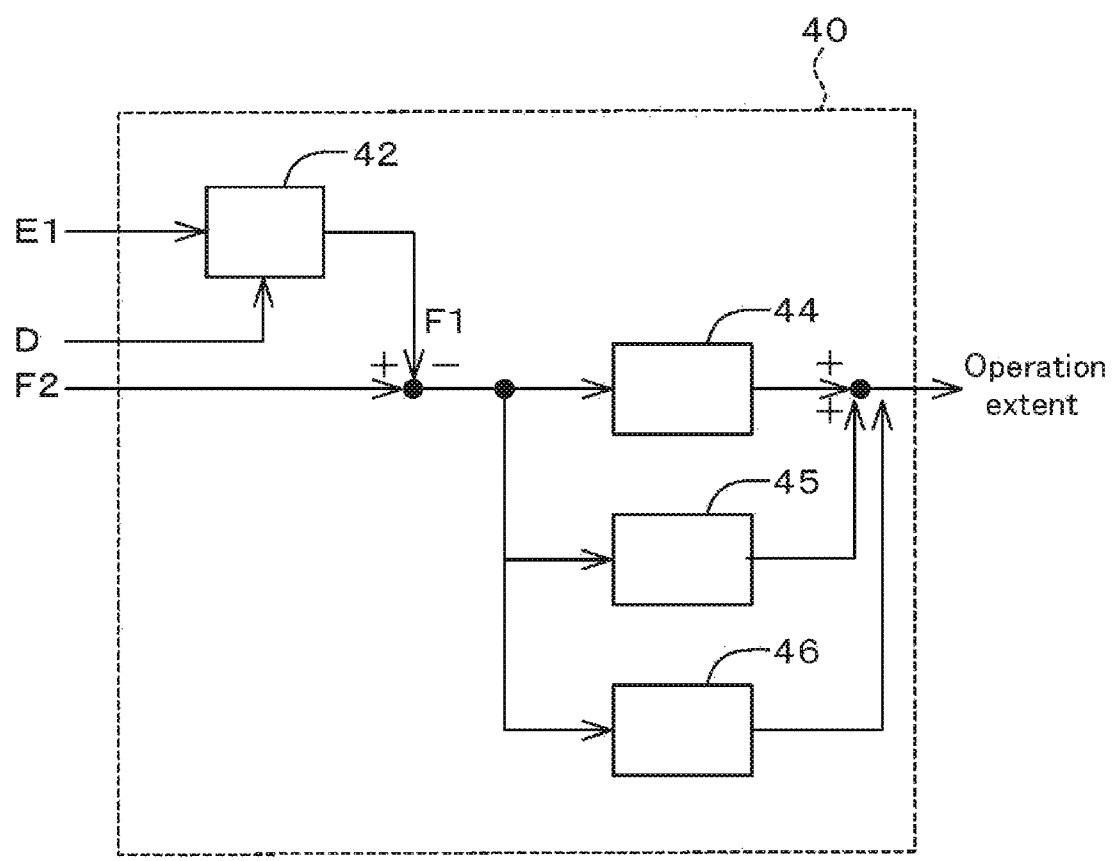
FIG. 5 is a view illustrating a control block chart according to the first embodiment.

The proportional control part 44, the integral control part 45, and the differential control part 46 are constituted of electric/electronic parts constituting the control device 40, programs incorporated in the control device 40, and the like. FIG. 5 shows a control block of the control device 40. With reference to FIG. 5, the proportional control part 44, the integral control part 45, and the differential control part 46 will be described below.

As shown in FIG. 5, the setting part 42 of the control device 40 obtains the target rotation speed of the fan (F1=E1−D) with used of the actual revolution speed (E1) of the engine detected by the first detecting device 41 and the predetermined rotation speed (D) stored in advance in the control device 40. The control device 40 obtains the difference (F1−F2) between the actual rotation speed (F2) of the fan detected by the second detecting device 43 and the target rotation speed (F1) of the fan. The proportional control part 44 performs the proportional control (the P control) by multiplying the difference (F1−F2) between the target rotation speed of the fan and the actual rotation speed of the fan by the gain. Thus, since the proportional control part 44 performs the P control on the difference between the actual rotation speed of the fan and the target rotation speed of the fan, it is possible to quickly change the actual rotation speed of the fan to the target rotation speed of the fan. And further, since the target rotation speed of the fan is the value after the responsiveness improvement processing, the actual rotation speed of the fan can be close to the target rotation speed of the fan without being stuck to the actual rotation of the engine when the target rotation speed of the fan is changed.

The integral control part 45 performs the integral control (the I control) by multiplying the difference (F1−F2) between the actual rotation speed of the fan and the target rotation speed of the fan by the gain. Thus, since the integral control part 45 performs the I control on the difference between the actual rotation speed of the fan and the target rotation speed of the fan, it is possible to accurately match the actual rotation speed of the fan with the target rotation speed of the fan. And further, since the target rotation speed of the fan is the value after the responsiveness improvement processing, the actual rotation speed of the fan can be close to the target rotation speed of the fan without being stuck to the actual rotation of the engine when the target rotation speed of the fan is changed when the target rotation speed of the fan is changed.

The differential control part 46 performs the differential control (the D control) by multiplying the difference (F1−F2) between the actual rotation speed of the fan and the target rotation speed of the fan by the gain. Thus, since the differential control part 46 performs the D control on the difference between the actual rotation speed of the fan and the target rotation speed of the fan, the differential control part 46 quickly corrects the actual rotation speed of the fan relative with respect to the target rotation speed of the fan. And further, since the target rotation speed of the fan is the value after the responsiveness improvement processing, the actual rotation speed of the fan can be close to the target rotation speed of the fan without being stuck to the actual rotation of the engine when the target rotation speed of the fan is changed.

Thus, the control device 40 determines the control value (an operation extent) under the PID control, and outputs the control signal corresponding to the control value to a coil of the fluid setting device 24, thereby setting, the rotating of the fan. Meanwhile, the control signal is a signal in which the duty ratio is set based on the control value, and the control device 40 sets the aperture degree of the fluid setting device 24 under the PWM control.

In addition, the control device 40 has a changing part 47. The changing part 47 is constituted of electric/electronic parts constituting the control device 40, programs incorporated in the control device 40, and the like.

The changing part 47 changes at least either the proportional control (the P control), the integral control (the I control), or the differential control (the D control) on the basis of the states of the engine 18 or the fan 25.

Figure 6A:
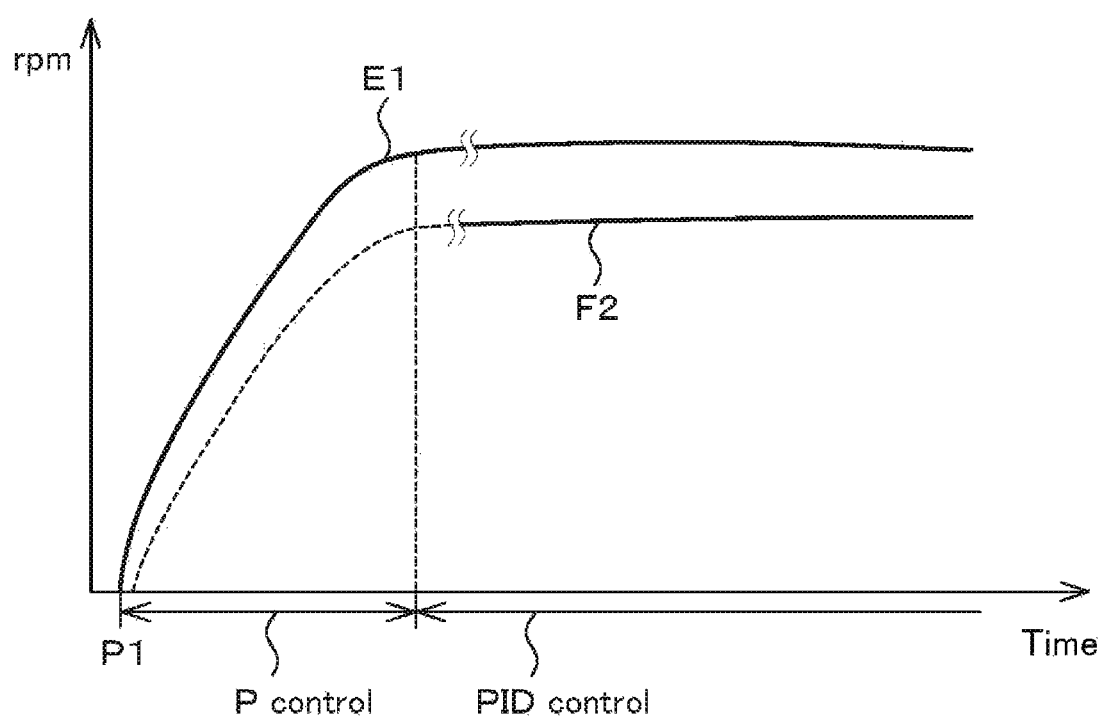
FIG. 6A is a view illustrating a relation between the actual rotation speed of the fan and the actual rotation speed of the engine in the starting of the engine according to the first embodiment.

The changing part 47 inactivates the integral control part 45 and the differential control part 46 at the time of starting the engine 18. In particular, as shown in FIG. 6A, the changing section 47 inactivates the I control and the D control until the actual revolution speed E1 of the engine reaches a predetermined rotation speed after starting the engine 18 at the point P1, and thereby the control device 40 controls the fan 25 under the P control.

Figure 6B:
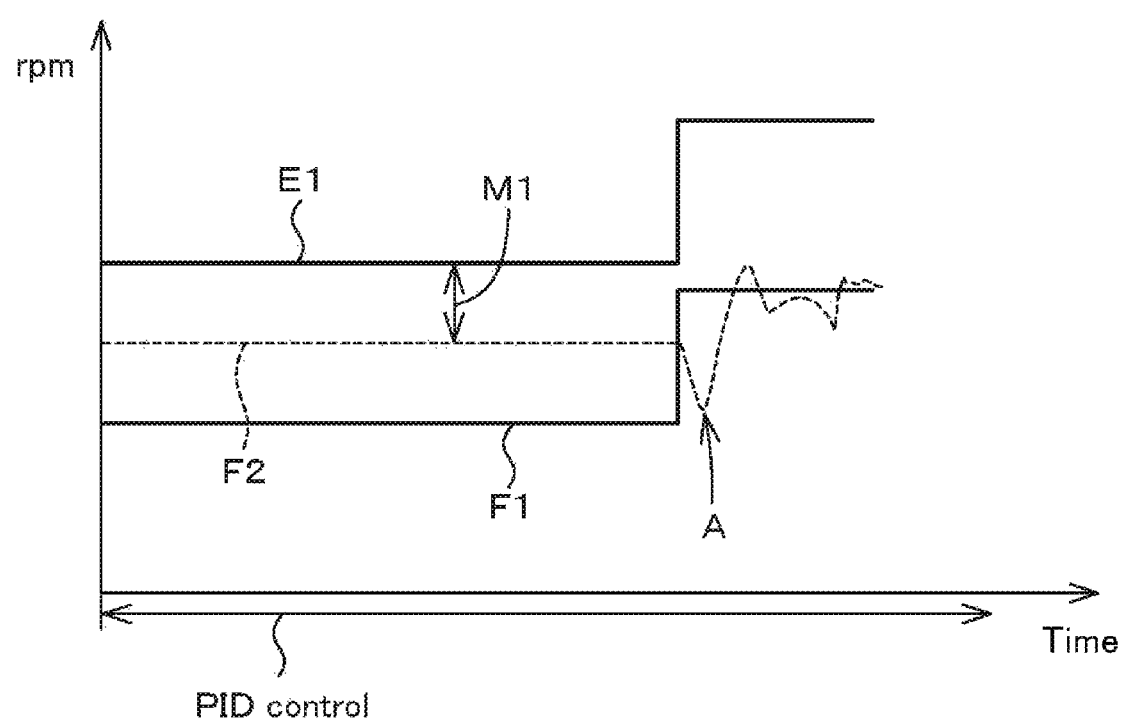
FIG. 6B is a view illustrating a relation between the actual rotation speed of the engine, the actual rotation speed of the fan, the target rotation speed of the fan, and a threshold value according to the first embodiment.

In addition, as shown in FIG. 6B, under the situation where the PID control is performed, the changing part 47 inactivates the integral control part 45 and the differential control part 46 in the case where the actual rotation speed F2 of the fan is larger than a predetermined threshold value M1 by the difference between the actual revolution speed E1 of the engine and the predetermined rotation speed. In particular, under the situation where the PID control is performed, the changing part 47 assumes that "the actual rotation speed F2 of the fan>the actual revolution speed E1 of the engine−80 rpm=the threshold value (the judgment value" (the actual rotation speed F2 becomes close to the actual revolution speed E1 of the engine). When the target rotation speed of the fan is increased under the situations described above (when the actual revolution speed of the engine has increased), there is a possibility that the over shoot may occur in the process (an arrowed line A) in which the actual rotation speed of the fan approaches the target rotation speed of the fan. Thus, when the difference between the actual rotation speed F2 of the fan and the actual revolution speed E1 of the engine becomes less than the judgment value (for example, 80 rpm), the changing part 47 inactivates the integral control part 45 and the differential control part 46. Meanwhile, note that the judgment value is approximately a half value of the sticking prevention rotation speed, and the judgment value is preferably 55% of the sticking prevention rotation speed, for example. In this manner, the overshoot can be reduced even when the target rotation speed of the fan is increased.

The changing part 47 activates the integral control part 45 and the differential control part 46 when the actual rotation speed of the fan is equal to or lower than the judgment value (the actual rotation speed of the fan≥the judgment value) under the condition that the integral control part 45 and the differential control part 46 are inactivated. That is, the changing part 47 changes the control to the PID control.

Figure 7A:
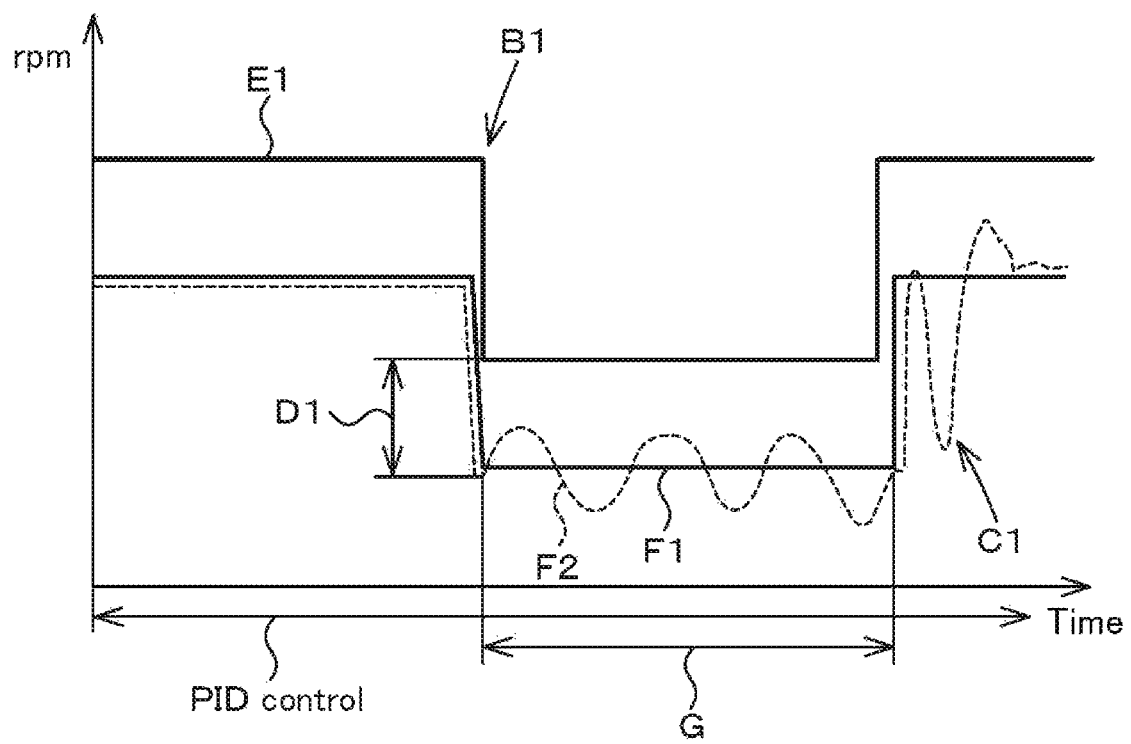
FIG. 7A is a view illustrating a relation between the actual rotation speed of the engine, the actual rotation speed of the fan, a target rotation speed of the fan, and a PID control of a case where the actual rotation speed of the engine is decreased according to the first embodiment.
Figure 7B:
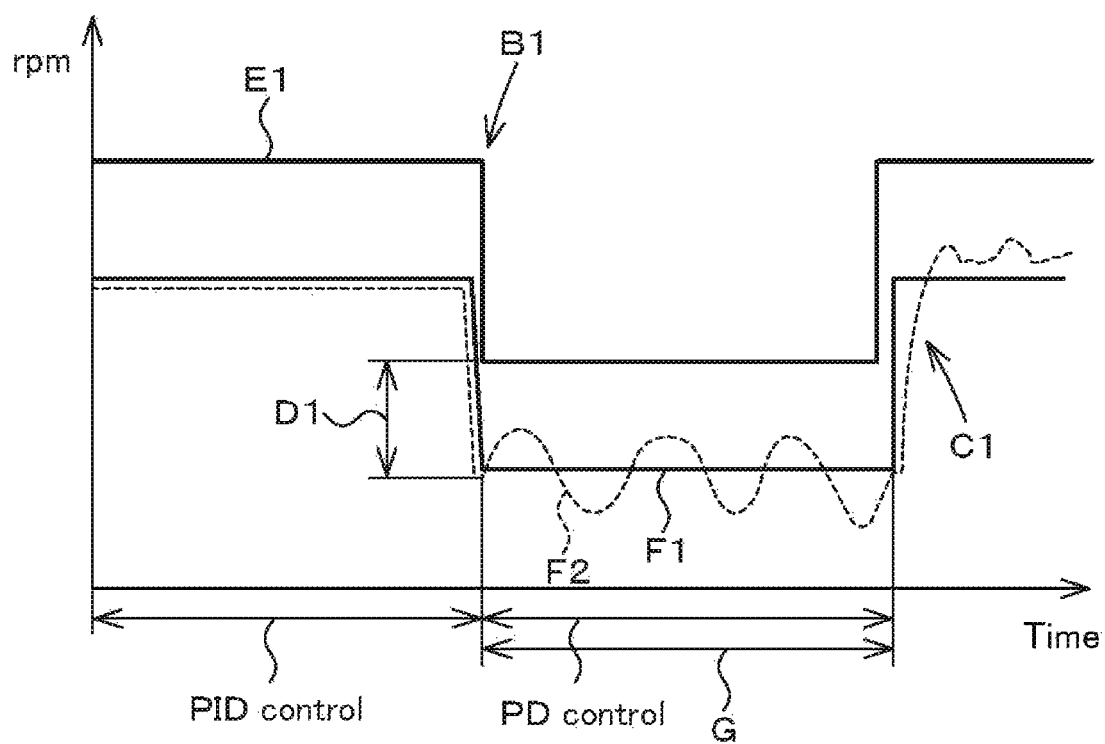
FIG. 7B is a view illustrating a relation between the actual rotation speed of the engine, the actual rotation speed of the fan, a target rotation speed of the fan, and a PD control of a case where the actual rotation speed of the engine is decreased according to the first embodiment.

Now, FIG. 7A shows a state where the actual revolution speed of the engine is lowered under the state where the PID control is performed. As indicated by an arrowed line B1 in FIG. 7A, when the actual revolution speed E1 of the engine is lowered, the target rotation speed F1 of the fan decreases in accordance with the decreasing. After the actual revolution speed E1 of the engine is decreased, it is desirable that the target rotation speed F1 of the fan decreases and the actual rotation speed F2 of the fan decreases following the decreased target rotation speed F1 of the fan. However, in the actual control, the actual rotation speed F2 of the fan may be increased and decreased (may oscillate) with respect to the target rotation speed F1 of the fan. The variation width of the actual rotation speed F2 of the fan is ±70 to 80 rpm with respect to the target rotation speed F1 of the fan at that time, that is, about half of the sticking prevention rotation speed. When the PID control is continued under the state where the actual rotation speed F2 of the fan varies up and down by a predetermined width or more with respect to the target rotation speed F1 of the fan, and further when the target rotation speed of the fan is increased again, the overshoot becomes large as shown by the arrowed line C1 in FIG. 7A. That is, it is assumed that the difference (D1=E1−F2) between the actual revolution speed E1 of the engine and the actual rotation speed F2 of the fan becomes equal to or less than the sticking prevention engine speed by lowering the actual revolution speed E1 of the engine by a predetermined value or more. In that case, when the PID control is continued, the overshoot becomes large as indicated by the arrowed line C1 in FIG. 7A in the case where the target rotation speed of the fan is increased. As the result of lowering the actual revolution speed E1 of the engine, it is considered that the overshoot becomes large by increasing the I component of the integral control in the section G1 where the difference between the actual revolution speed E1 of the engine and the actual rotation speed F2 of the fan is equal to or smaller than a predetermined value (is ½ times of the sticking, prevention rotation speed) (that is, in the section from decreasing the actual revolution speed of the engine to increasing the actual revolution speed). Thus, as described above, when the difference D1 between the actual revolution speed E1 of the engine and the actual rotation speed of the fan is a predetermined value or less (equal to or less than a half of the sticking prevention rotation speed) under the state where the actual revolution speed E1 of the engine is decreased by a predetermined value or more, the changing part 47 inactivates the integral control part 45 as shown in FIG. 7B. For example, under sate where the actual revolution speed E1 of the engine is lowered at the point P2 in FIG. 7B, the changing part 47 changes the control of the fan from the PID control to the PD control when the difference D1 between the actual revolution speed E1 of the engine and the actual rotation speed of the fan is ½ times of or less than the sticking prevention rotation speed. In this manner, the overshoot of the actual rotation speed F2 of the fan can be suppressed as indicated by the arrowed line C1 in FIG. 7B.

For example, the actual revolution speed of the engine may be reduced by a predetermined value or more under the state where the working device 3 of the working machine shovels the loads (the cargo such as earth) with the bucket 10 and the like and slowly lifts up the lift arm 9 from that state, the working machine 3 loads and unloads the cargo, the working machine 3 waits for a transport vehicle such as a truck loading the cargo into the bucket, and the working machine 3 stops at a signal or the like from a running state. In that case, the fan will be controlled under the PD control. Thus, under that situations, it is possible to suppress the overshoot of the case where the actual rotation speed F2 of the fan is increased again.

Second Embodiment

Figure 8:
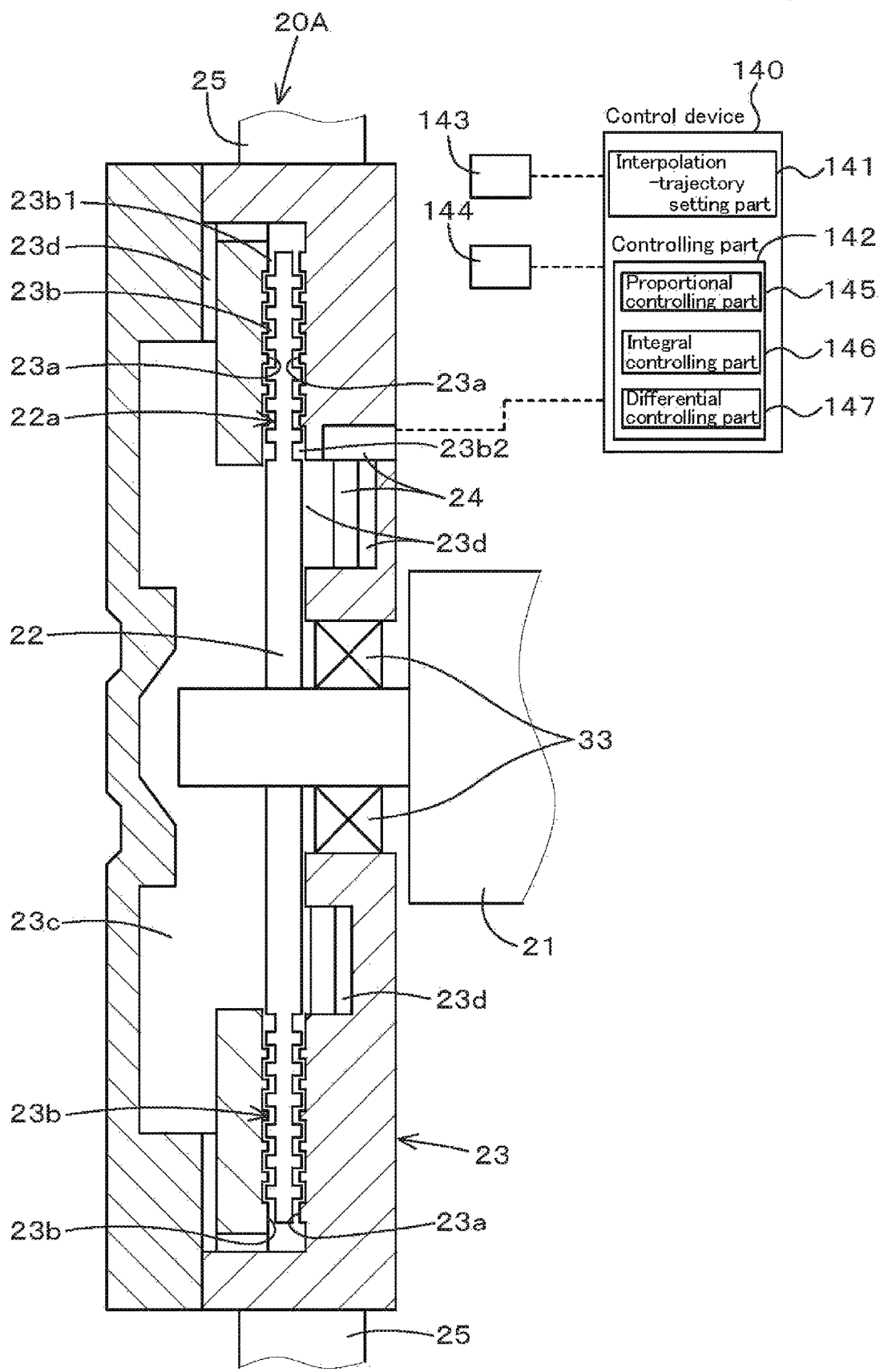
FIG. 8 is a view illustrating a cooling control system for a working machine according to a second embodiment of the present invention.

FIG. 8 shows a cooling control system for a working machine according to a second embodiment of the present invention. In the second embodiment, configurations different from the configurations of the first embodiment will be described. Meanwhile, in the second embodiment, the configurations of the cooling device 20A is similar to the configurations of the cooling device 20 of the first embodiment.

The control of the cooling device 20A is carried out by the control device 140 constituted of a CPU or the like. The control device 140 controls the rotation speed of the fan 25 by outputting a control signal to the fluid setting device 24 to change the aperture degree of the fluid setting device 24. That is, the control device 140 controls the fluid setting device 24 such that the actual rotation speed of the fan 25 and the target rotation speed of the fan 25 are matched with each other.

When the target rotation speed of the fan 25 is given, the control device 140 sets a trajectory in which the rotation speed of the fan 25 reaches from the actual rotation speed to the target rotation speed, and thereby controls the actual rotation speed of the fan 25 in accordance with the trajectory.

The control of the control device 140 will be described below in detail.

Figure 9:
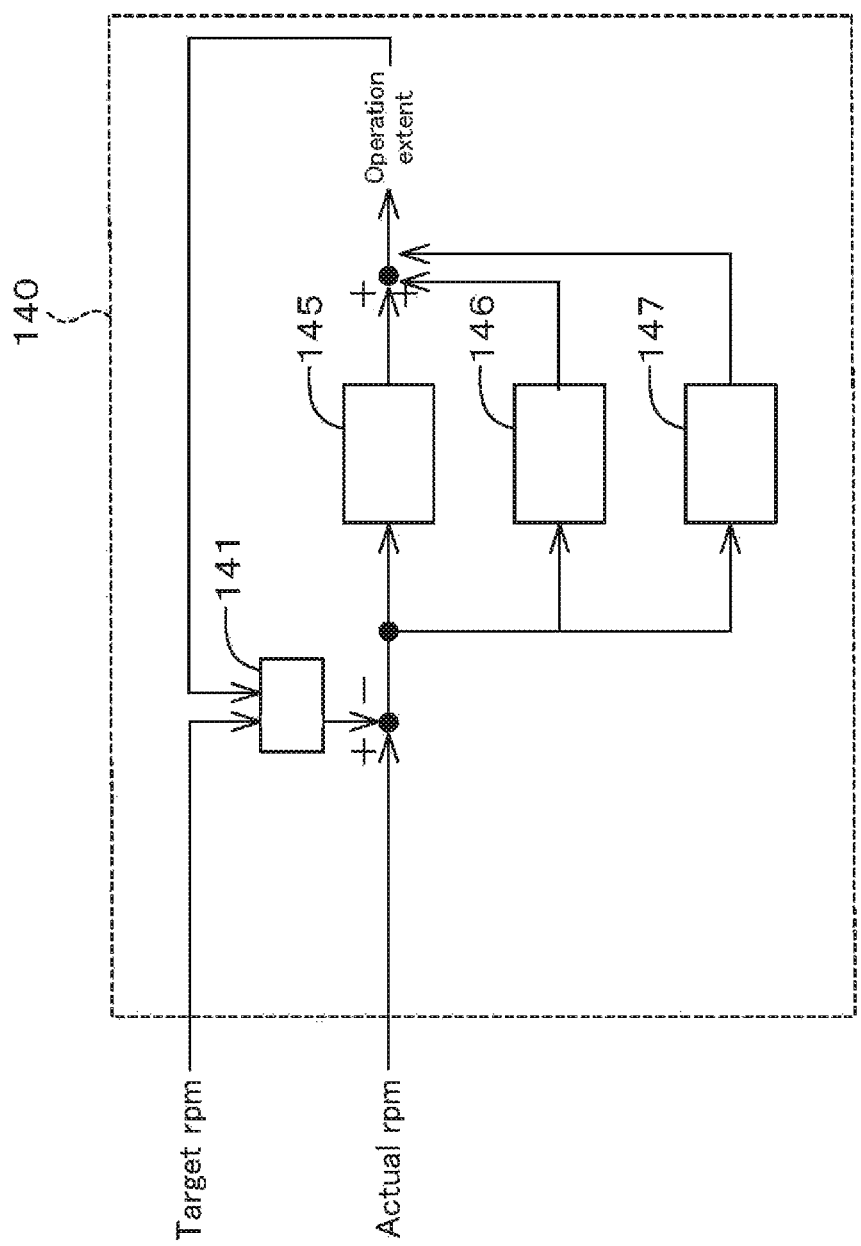
FIG. 9 is a view illustrating a control block according to the second embodiment.
Figure 10:
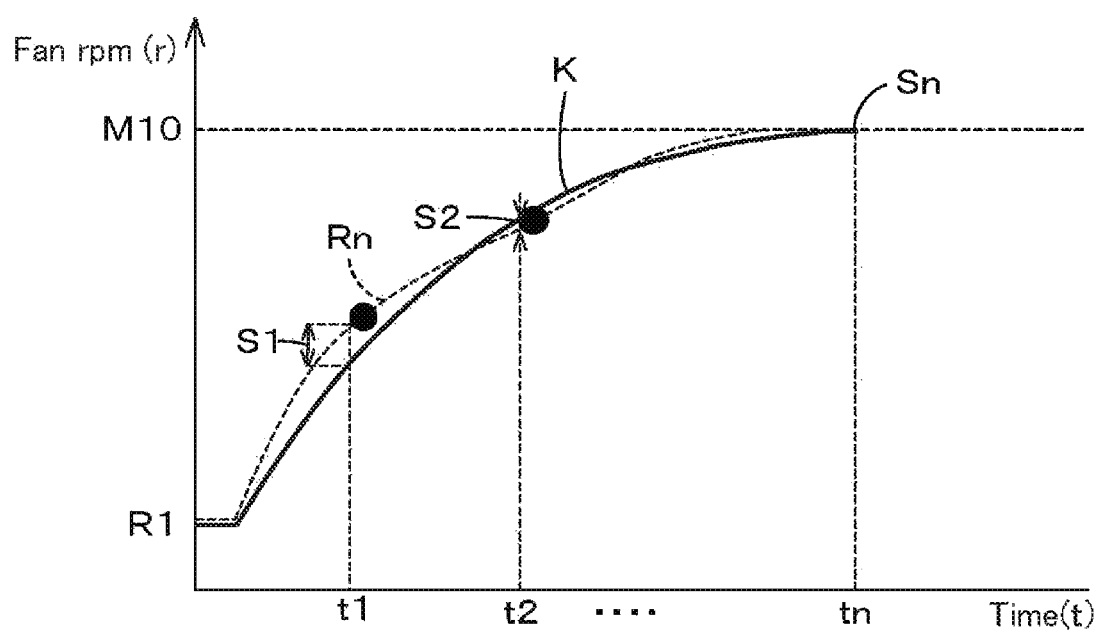
FIG. 10 is a view illustrating a relation between a target rotation speed of a fan, an actual rotation speed of the fan, and an interpolation trajectory according to the second embodiment.

As shown in FIG. 8 to FIG. 10, the control device 140 includes an interpolation-trajectory setting part 141 configured to set the interpolation trajectory K, and a controlling part 142 configured to control the actual rotation speed of the fan 25. The interpolation-trajectory setting part 141 and the controlling part 142 are constituted of electric/electronic parts constituting the control device 140, programs incorporated in the control device 140, and the like.

As shown in FIG. 10, the interpolation trajectory K is a line indicating the rotation speed r of the fan 25 at the predetermined time t, and is a trajectory for smoothly increasing the actual rotation speed of the fan 25 to make the actual rotation speed to reach the target rotation speed. The interpolation-trajectory setting part 141 sets the interpolation trajectory K shown in FIG. 10 on the basis of the target rotation speed of the fan 25 and the polynomial interpolation function. The polynomial interpolation function is, for example, a cubic polynomial $[f(t)=a_0+a_1t+a_2t^2+a_3t^3]$ and a quintic polynomial $[f(t)=a_0+a_1t+a_2t^2+a_3t^3a_4t^4+a_5t^5]$. Here, the "$a_0, a_1, a_2, a_3, a_4, a_5$" are variables, and are set corresponding to the target rotation speed of the fan 25, for example. The "t" is time, the "f(t)" is the rotation speed of the fan 25. The interpolation-trajectory setting part 141 stores the cubic polynomial or the quintic polynomial described above for each target rotation speed. Variables of the cubic polynomial or the quintic polynomial are values that reduce vibrations (impacts) to a predetermined magnitude or less, the vibrations (impacts) being occurred in the bearings, the pulleys, the belts, and the like by the changing of the rotation speed of the fan 25 and that are given in the computer simulation, the experiments, or the like. Meanwhile, in the embodiment described above, the variables of the cubic polynomial or the quintic polynomial are set corresponding to the target rotation speed of the predetermined fan 25. However, in place of that, the variables may be set in accordance with the relation between the given target rotation speed of the fan 25 and the actual rotation speed of the fan 25, the actual rotation speed of the fan 25 being obtained immediately before the target rotation speed of the fan 25 is given.

The controlling part 142 controls the actual rotation speed of the fan 25 on the basis of the interpolation trajectory K set by the interpolation-trajectory setting part 141. At first, referring to FIG. 10, an outline of the control carried out by the control device 140 (the controlling part 142) will be described.

As shown in FIG. 10, the actual rotation speed of the fan 25 immediately before the target rotation speed of the fan 25 is given is "R1", the target rotation speed of the fan 25 is "M10", and the interpolation trajectory is "K", for example. The controlling part 142 obtains a difference Sn (n=1, 2, 3, 4 . . . ) between the actual rotation speed Rn (n=1, 2, 3, 4, . . . ) of the fan 25 at a predetermined time tn (n=1, 2, 3, 4 . . . ) and the rotation speed f(t) of the fan 25 at the predetermined time tn on the interpolation trajectory K. Then, the controlling part 142 controls the actual rotation speed of the fan 25 so that the difference Sn becomes zero at the predetermined time tn.

Next, the control of the fan 25 will be described in detail with reference to FIG. 8 and FIG. 9.

As shown in FIG. 8, a first detecting device 143 and a second detecting device 144 are connected to the control device 140. The first detecting device 143 is a device configured to detect the actual rotation speed of the fan 25 (the housing 23). That is, the first detecting device 143 is provided in the vicinity of the fan 25 or the housing 23, and detects the actual rotation speed of the fan 25. The second detecting device 144 is a device configured to detect the environmental temperature inside the working machine (the temperature of the prime mover 18, the temperature of the engine room, and the like) or the ambient temperature outside the working machine.

The controlling part 142 includes a proportional controlling part 145, an integral controlling part 146, and a differential controlling part 147. The proportional controlling part 145, the integral controlling part 146, and the differential controlling part 147 are constituted of electric/electronic parts constituting the control device 140, a program incorporated in the control device 140, and the like.

The control device 140 determines the target rotation speed of the fan 25 on the basis of the temperature (the ambient temperature) detected by the second detecting device 144. Meanwhile, the target rotation speed of the fan 25 may be set based on the temperature environment of the inside or the outside of the working machine. However, the target rotation speed may be set under other conditions, and thus is not limited to the above-mentioned conditions.

As shown in FIG. 9, the target rotation speed of the fan 25 is inputted to the interpolation-trajectory setting part 141, and the interpolation-trajectory setting part 141 sets the interpolation trajectory K on the basis of the target rotation speed of the fan 25. The controlling part 142 obtains the difference Sn between the actual rotation speed Rn of the fan 25 and the rotation speed f(t) of the fan 25 of the interpolation trajectory K set by the interpolation-trajectory setting part 141. The proportional controlling part 145 performs the proportional control (the P control) by multiplying the difference Sn between the actual rotation speed Rn of the fan 25 and the rotation speed f(t) of the fan 25 in the interpolation trajectory K by a gain. Thus, since the proportional controlling part 145 performs the P control on the difference Sn between the actual rotation speed Rn of the fan 25 and the rotation speed f(t) of the fan 25, the proportional controlling part 145 can quickly change the actual rotation speed Rn of the fan 25 to the rotation speed f(t) of the fan 25.

The integral controlling part 146 performs the integral control (the I control) by multiplying the difference Sn between the actual rotation speed Rn of the fan 25 and the rotation speed f(t) of the fan 25 by a gain. Thus, since the integral controlling part 146 performs the I control on the difference Sn between the rotation speed f(t) of the fan 25 and the actual rotation speed Rn of the fan 25, the integral controlling part 146 can accurately match the actual rotation speed Sn of the fan 25 to the rotation speed f(t) of the fan 25.

The differential controlling part 147 performs the differential control (the D control) by multiplying the difference Sn between the rotation speed f(t) of the fan 25 and the actual rotation speed Rn of the fan 25 by a gain. Thus, since the differential controlling part 147 performs the D control on the difference Sn between the rotation speed f(t) of the fan 25 and the actual rotation speed Rn of the fan 25, the differential controlling part 147 can quickly correct the actual rotation speed of the fan 25 with respect to the target rotation speed of the fan 25.

Thus, the controlling part 142 determines the control value (the operation extent) at the predetermined time to under the PID control and outputs the control signal corresponding to the control value to the coil of the fluid setting device 24, and thereby the rotating of the fan 25 is set. Meanwhile, note that the control signal is a signal in which the duty ratio is set according to the control value, and the controlling part 142 sets the aperture degree of the fluid setting device 24 under the PWM control.

Then, until the actual rotation speed of the fan 25 reaches the target rotation speed of the fan 25, that is, until the actual rotation speed of the fan 25 reaches the target rotation speed of the fan 25. the controlling part 142 repeatedly controls the actual rotation speed of the fan 25 on the basis of the interpolation trajectory K.

As described above, the cooling control system for the working machine includes the interpolation-trajectory setting, part 141 and the controlling part 142. Thus, in the case where the rotation speed of the fan 25 is increased or decreased, the interpolation-trajectory setting part 141 can gradually increase or decrease the actual rotation speed of the fan 25 even when the difference between the current actual rotation speed of the fan 25 and the target rotation speed of the fan 25 is large. That is, since the actual rotation speed of the fan 25 is interpolated based on the interpolation trajectory K of the interpolation-trajectory setting part 141 until the actual rotation speed of the fan 25 reaches the target rotation speed of the fan 25, it is possible to suppress the vibrations (the impacts) in the case of increasing and decreasing the rotation speed of the fan 25.

In addition, the controlling part 142 controls the actual rotation speed of the fan 25 on the basis of the difference Sn between the actual rotation speed of the fan 25 and the rotation speed of the fan 25 obtained based on the interpolation trajectory K at the predetermined time tn. Thus, it is possible to reduce the vibrations as much as possible, the vibrations being generated when the rotation speed of the fan 25 is increased and decreased.

The controlling part 142 includes a proportional controlling part 145, an integral controlling part 146, and a differential controlling part 147. Thus, the overshoot or the like can be suppressed from being generated in the case where the rotation speed of the fan 25 is increased or decreased, and thus the rotation speed of the fan 25 can be increased or decreased more smoothly.

Third Embodiment

Figure 11:
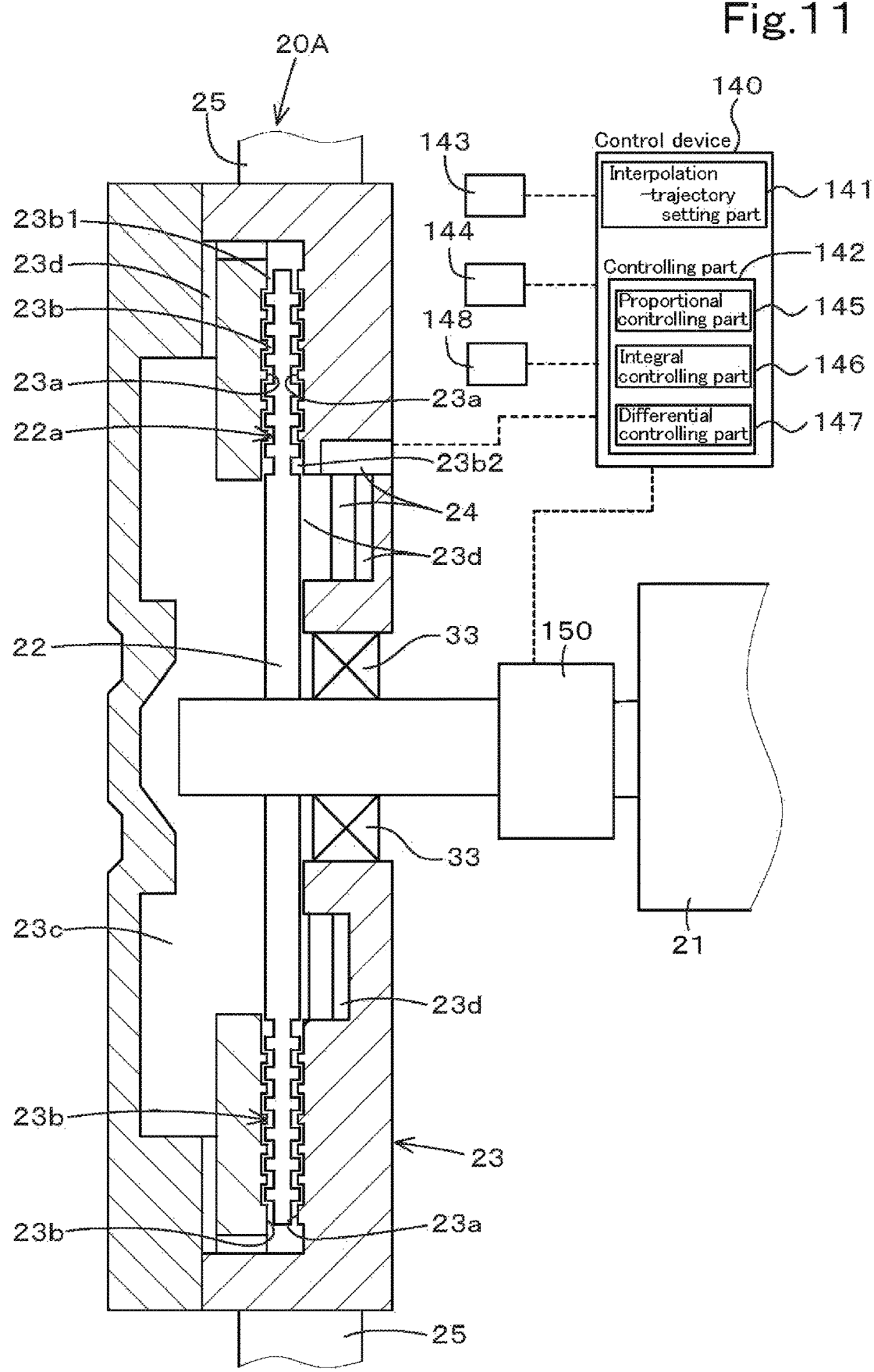
FIG. 11 is a view illustrating a cooling control system for a working machine according to a third embodiment of the present invention.
Figure 12:
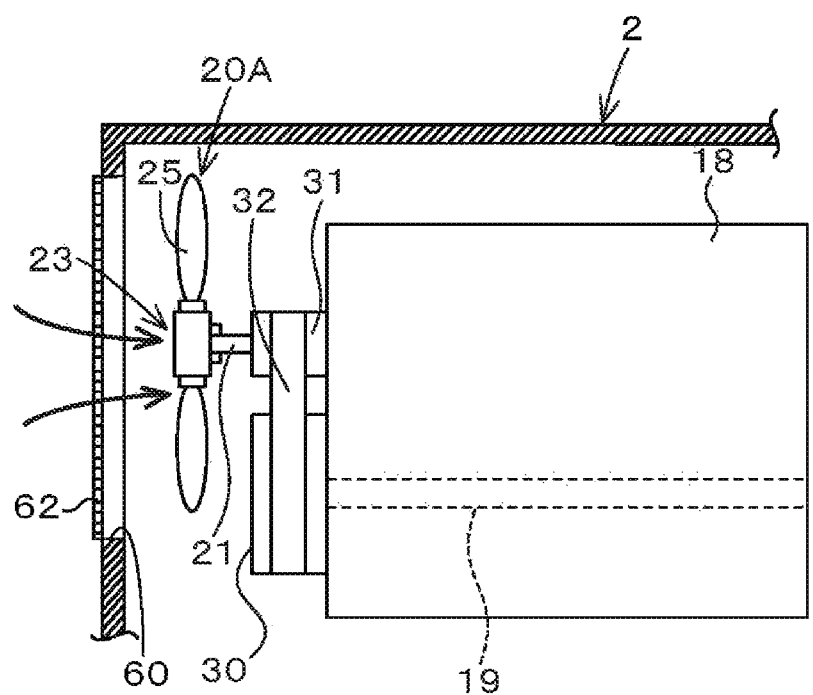
FIG. 12 is a schematic view illustrating an attachment portion by which a cooling device is attached to the working machine according to the third embodiment.

FIG. 11 and FIG. 12 show a part of a working machine and a cooling control system of the working machine according to a third embodiment of the present invention. In the third embodiment, the description of the configurations similar to those of the second embodiment will be omitted.

As shown in FIG. 12. the cooling device 20A is provided in the vicinity of the opening portion 60 formed in the working machine. The cooling device 20A takes in the outside air from the opening portion 60 during the normal rotation and takes the air into the machine body 2, and thereby cooling the interior of the machine body 2. A dustproof member 62 is provided in the opening 60.

As shown in FIG. 11, the cooling control system of the working machine includes a switching part ISO configured to change the rotating direction of the rotor 22 of the cooling device 20A. That is, the fan 25 can be rotated forward or reverse by the switching part 150. The switching part 150 is constituted of, for example, a hydraulic clutch or the like, and it is possible to change the rotating direction of the rotating shaft 21 (the rotor 22) depending on the connecting position of the hydraulic clutch. The forward rotating or the reverse rotating of the fan 25 (the switching of the switching part 150) is performed by the switch 148 connected to the control device 140, for example. The switch 148 is turned to be ON (be pressed) to set the reverse rotating of the fan 25. In addition, the switch 148 sets the forward rotating of the fan 25 by being pushed again from the ON state. Meanwhile, the setting of the forward rotating or the reverse rotating of the fan 25 by the switch 148 is not limited to the above-described method.

Figure 13:
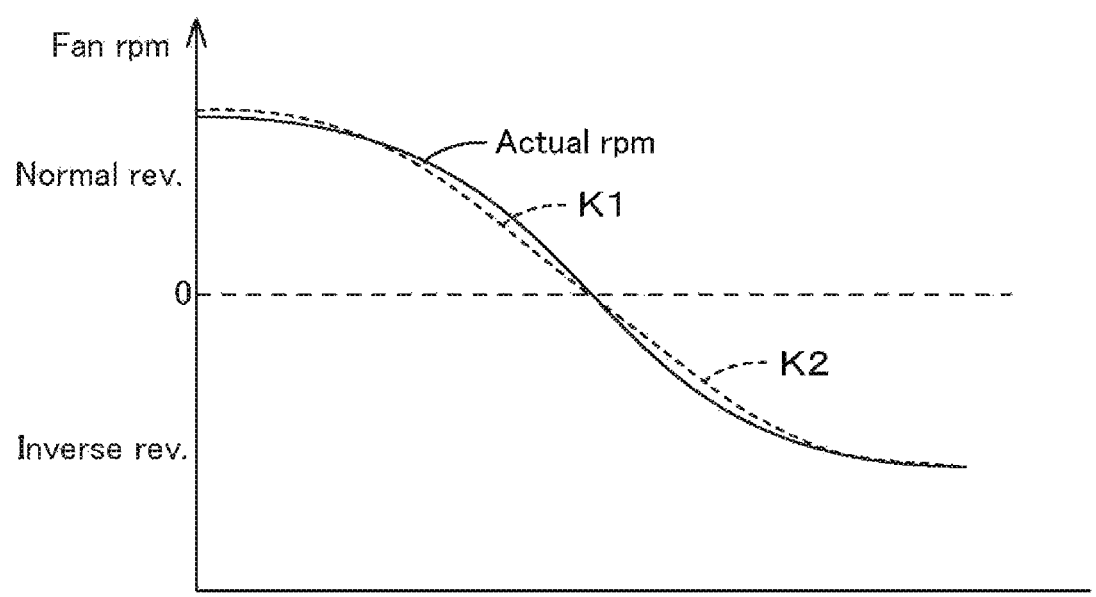
FIG. 13 is a view illustrating a relation between a target rotation speed of a fan in a normal rotation and an inverse rotation, an actual rotation speed of the fan, and an interpolate trajectory according to the third embodiment.

FIG. 13 shows the transition of the rotation speed of the fan 25 of the case where the rotating direction of the fan 25 is changed from the forward rotating to the reverse rotating. In the case where the switch 148 is pushed from the state in which the fan 25 is in the normal rotating state (in the case where the reverse rotating of the fan 25 is set), the control device 140 firstly decreases the actual rotation speed of the fan 25. In particular, the interpolation-trajectory setting part 141 sets the decreasing interpolation trajectory K1 as the interpolation trajectory K, the decreasing interpolation trajectory K1 reducing the rotation speed of the fan 25 in the forward rotating (the normal rotating), when the switch 148 is pushed (at the time of issuing a command to reduce the actual rotation speed of the fan 25). The target rotation speed of the fan 25 in setting the decreasing interpolation trajectory K1 is zero. The controlling part 142 controls the actual rotation speed of the fan 25 on the basis of the decreasing interpolation trajectory K1.

When the actual rotation speed of the fan 25 becomes zero or unlimitedly zero, the control device 140 outputs a command to the switching part 150 to reverse the rotating of the fan 25. And, when the fan 25 is reversely rotated, the control device 140 gradually increases the rotation speed of the fan 25. In particular, when the actual rotation speed of the fan 25 becomes zero or unlimitedly zero, the interpolation-trajectory setting part 141 sets the increasing interpolation trajectory K2 as the interpolation trajectory K, the increasing interpolation trajectory K1 increasing the rotation speed of the fan 25 in the back rotating (the inverse rotating). The target rotation speed of the fan 25 in setting the increasing interpolation trajectory K2 is a value preliminarily set in the control device 140 (the interpolation-trajectory setting part 141). The controlling part 142 controls the actual rotation speed of the fan 25 on the basis of the increasing interpolation trajectory K2. Meanwhile, the control of the actual rotation speed of the fan 25 in the controlling part 142 is the same as that in the first embodiment described above.

As described above, the interpolation-trajectory setting part 141 sets the decreasing interpolation trajectory K1 in changing the rotating direction of the fan 25 from the forward rotating to the reverse rotating, and sets the increasing interpolation trajectory K2 in increasing the rotation speed after the rotating direction of the fan 25 is changed to the reverse rotating. Thus, it is possible to suppress the vibrations (the impacts) generated when the rotating direction of the fan 25 is reversed from forward rotating. For example, since the working machine 1 is used in various places, grass, straw or the like may be entangled with the dustproof member 62 when sucking the outside air for a long time. For this reason, for example, the operator pushes the switch 148 to change the rotating direction of the fan from the forward rotating to the reverse rotating, and thereby the grass, the straw, and the like entangled in the dust-proof member 62 are removed by the wind generated when the fan 25 rotates in the reverse direction. Even when the rotating direction of the fan is switched from the forward rotating to the reverse rotating in this manner, the shocks and the noise generated in the switching can be reduced.

Figure 14:
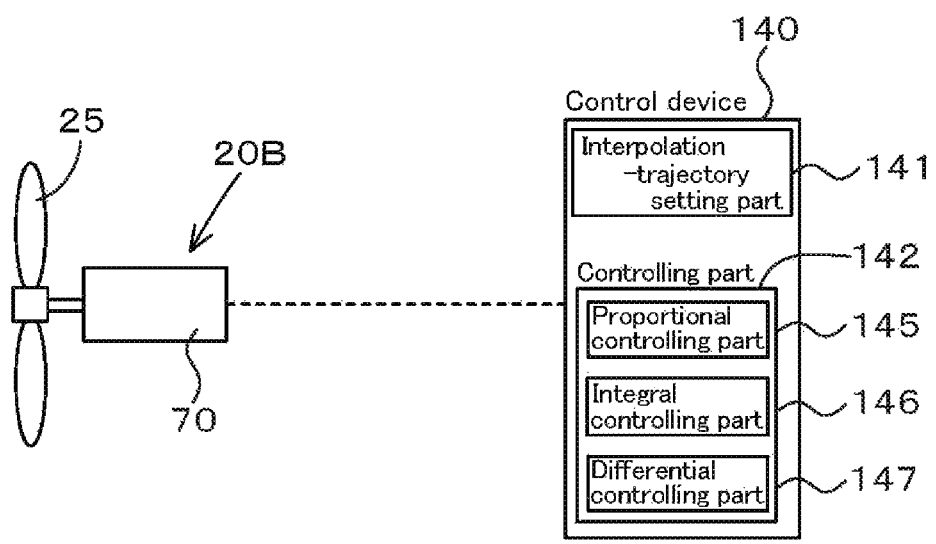
FIG. 14 is a view illustrating a cooling control system for a working machine according to a modified example of the third embodiment.

In the above-described embodiment, the cooling device 20A is a viscous type clutch fan configured to drive the prime mover 18 as a power source. Alternatively, as shown in FIG. 14, the cooling device 20B may be a device including an electric motor 70 and the fan 25 configured to be rotated by the rotating power of the motor 70. The electric motor 70 is controlled by the control device 140. The control device 140 outputs a control signal to the electric motor 70. and thereby controls the rotation speed of the electric motor 70. The electric motor 70 is configured to be rotated in the normal rotating and in the inverse rotating. The control device 140 includes the interpolation-trajectory setting part 141 and the controlling part 142. In addition the controlling part 142 includes the proportional controlling part 145, the integral controlling, part 146, and the differential controlling part 147. Meanwhile, the operations of the interpolation-trajectory setting part 141, the controlling part 142, the proportional controlling part 145, the integral controlling part 146, and the differential controlling part 147 are similar to those of the second embodiment described above, so the descriptions thereof will be omitted.

Fourth Embodiment

FIG. 15 to FIG. 18 show a working machine according to a fourth embodiment of the present invention. In the fourth embodiment, the configurations different from those of the above-described embodiments will be described.

Figure 15:
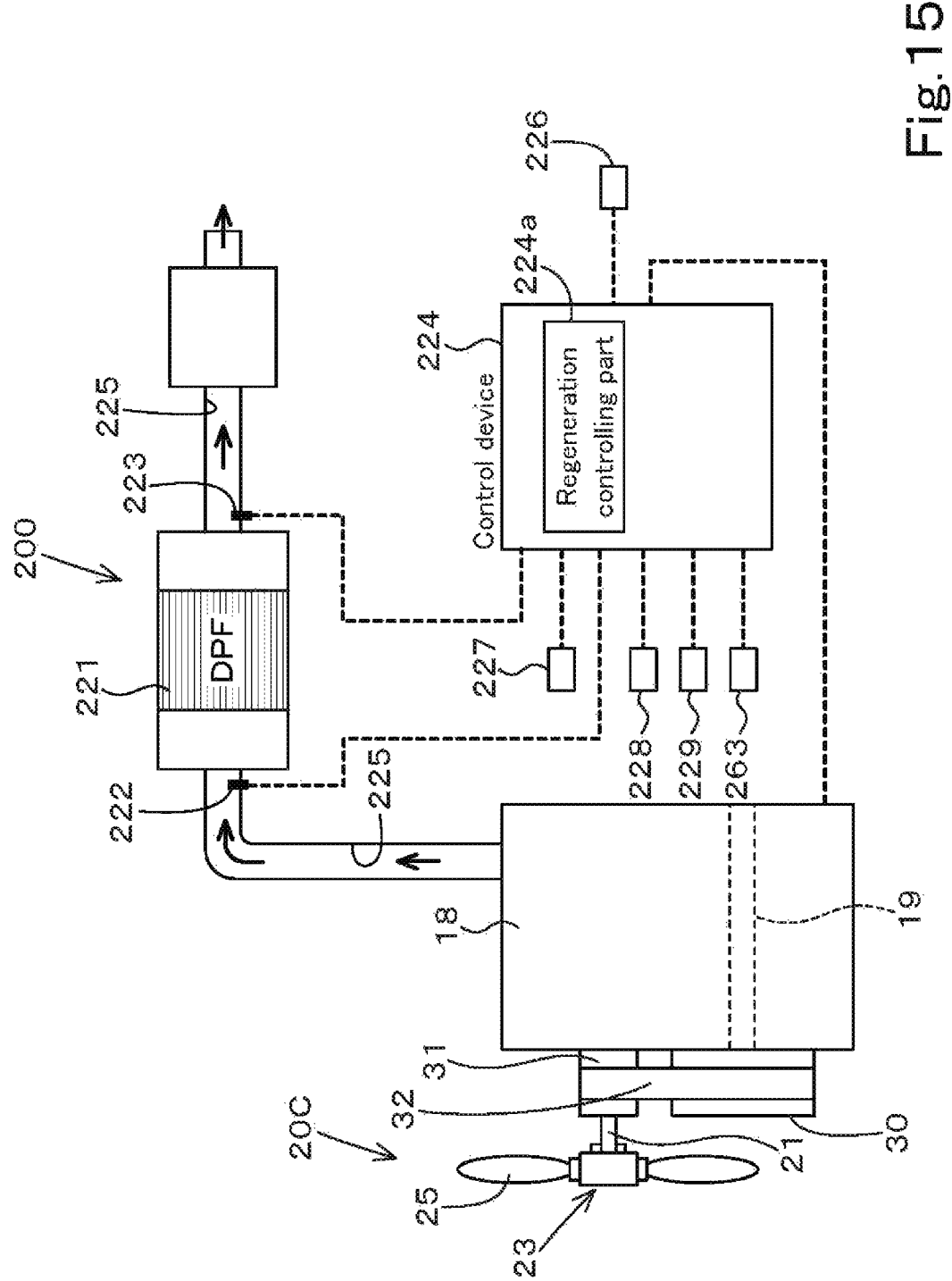
FIG. 15 is a view illustrating an exhaust gas purification device and a cooling device according to a fourth embodiment of the present invention.

As shown in FIG. 15, the wheel loader 1 includes an exhaust gas purification device 200.

The exhaust gas purification device 200 has a filter 221, a first pressure detecting device 222, a second pressure detecting device 223, and a control device 224. The filter 221 is a diesel particulate filter (a DPF), and is a filter for catching the particulate matter contained in the gas exhausted from the engine 18. For convenience of the explanation, the filter 221 is referred to as a DPF.

The DPF 221 is provided in the middle of the exhaust manifold 225 that is disposed in the engine 18. A silencer for reducing the exhaust sound is provided at the end portion of the exhaust manifold 225. The first pressure detecting device 222 is a sensor configured to detect a pressure of the exhaust gas in the exhaust manifold 225 (hereinafter may be referred to as an exhaust pressure), and is provided in the vicinity of the inlet of the DPF 221. The second pressure detecting device 223 is a sensor configured to detect the exhaust pressure in the exhaust manifold 225, and is provided in the vicinity of the outlet of the DPF 221. The first pressure detecting device 222 and the second pressure detecting device 223 are pressure sensors constituted of piezoelectric elements, for example. The exhaust pressures detected by the first pressure detecting device 222 and the second pressure detecting device 223 are outputted to the control device 224.

When there is no particulate matter deposit in the DPF 221 and there is no clogging in the DPF 221, the pressure loss by the DPF 221 is small, and thus a differential pressure between the exhaust pressure detected by the first pressure detecting device 222 (a first exhaust pressure) and the exhaust pressure detected by the second pressure detecting device 223 (a second exhaust pressure) is small. On the other hand, when particulate matter deposits in the DPF 221 and the magnitude of the clogging increases in the DPF 221, the pressure loss due to the DPF 221 increases, and thus the differential pressure between the first exhaust pressure and the second exhaust pressure increases. Since the magnitude of the differential pressure corresponds to the magnitude of the clogging of the DPF 221, the magnitude of the differential pressure can be employed as the magnitude of the clogging of the DPF 221, that is, the deposit amount of the particulate matter deposited in the DPF 221 (hereinafter also referred to as a PM deposit amount).

Now, an warning device 226, a setting member 227, and a measuring device 228 are connected to the control device 224. The warning device 226 is a speaker, an LED, a liquid crystal panel, or the like, and is provided in the vicinity of the operator seat 14. The setting member 227 is an accelerator lever swingably supported, an accelerator pedal swingably supported, a rotatable dial, and the like, which can be operated by the operator or the like who has boarded on the wheel loader 1. When the operator manually operates the setting member 227, it is possible to set the revolution speed of the engine. The measuring device 228 is a device configured to measure the temperature of the cooling water (hereinafter may be referred to as a water temperature) that cools the engine 18.

The control device 224 is constituted of a CPU and the like, and has a regeneration controlling part 224a. The regeneration controlling part 224a is constituted of electric/electronic parts constituting the control device 224, programs stored in the control device 224, and the like.

The regeneration controlling part 224a calculates the PM deposit amount in the DPF 221 on the basis of the first exhaust pressure detected by the first pressure detecting device 222 and the second exhaust pressure detected by the second pressure detecting device 223. The regeneration controlling part 224a issues a predetermined command to the engine 18 to increase the temperature of the exhaust gas of the exhaust manifold 225, and combusts the particulate matter accumulated in the DPF 221, thereby reducing the deposit amount of the particulate matter deposited on the DPF 221 (the PM deposit amount). That is, the regeneration controlling part 224a performs the regeneration of the DPF (hereinafter may be referred to as a DPF regeneration).

The regeneration controlling part 224a performs a first operation, a second operation, and a third operation in the DPF regeneration.

Next, the first operation, the second operation, and the third operation performed by the regeneration controlling part 224a will be described.

The first operation is an operation of increasing the engine speed. When the PM deposit amount becomes equal to or larger than a predetermined amount (an amount requiring the DPF regeneration), the regeneration controlling part 224a firstly outputs an informing signal to the warning device 226 as the first operation. Upon obtaining the informing signal, the warning device 226 informs that "the operator must increase the engine revolution speed (referred to as the rpm (revolutions per minute or rev. per minute)) to a revolution speed (a regeneration revolution speed) higher than an idling revolution speed by manually operating the setting member 227" by voices, lights, characters, and the like. That is, the warning device 226 outputs information for informing the operator that it is necessary to increase the engine speed. For example, the warning device 226 displays "Please operate the accelerator, and set the engine revolution speed to 1800 rpm or more, which is the regeneration revolution speed" on the basis of the informing signal output from the regeneration controlling part 224a.

After outputting the informing signal to the warning device 226, the regeneration controlling part 224a controls, as the first operation, the revolution speed of the engine on the basis of the operation extent of the setting member 227. Here, in the case where the engine revolution speed is equal to or higher than the regeneration revolution speed, the regeneration controlling part 224a stops outputting the informing signal to the warning device 226. In the case where the engine revolution speed is less than the regeneration revolution speed, the regeneration control part 224a continues to output the informing signal to the informing apparatus 226. When the operator recognizes the notification outputted by the warning device 226 and operates the setting member 227, the temperature of the exhaust gas can be increased by setting the engine revolution speed to be equal to or higher than the regeneration revolution speed.

The second operation is an operation of throttling the amount of the gas (the air) supplied to the engine 18, that is, the intake of the engine 18. When the water temperature measured by the measuring device 228 is equal to or higher than a predetermined temperature (for example, 65° C.), the regeneration controlling part 224a throttles the intake throttle of the engine 18 as the second operation, that is, reduces the aperture of the intake throttle. By throttling the intake air of the engine 18, it is possible to increase the temperature of the exhaust gas of the engine 18.

The third operation is an operation of injecting fuel (the post injection) to the combusted exhaust gas of the engine 18. As the third operation, the regeneration controlling part 224a outputs a command to the engine 18, the command ordering to execute the post injection of fuel. When the post injection of the fuel is executed in the engine 18, the temperature of the exhaust gas is increased in the exhaust manifold 225, and the combustion of the particulate matter deposited in the DPF 221 can be promoted.

Figure 16:
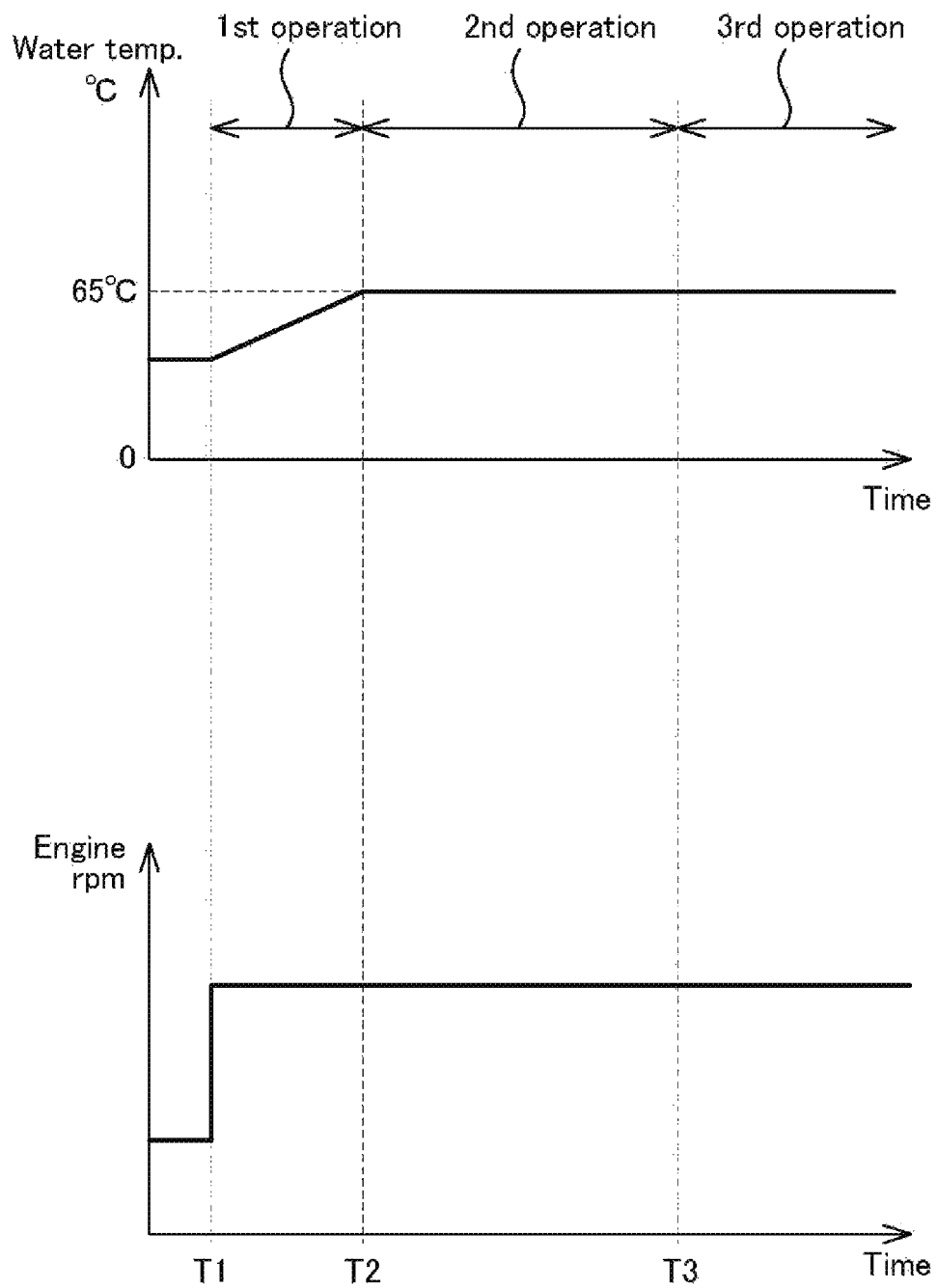
FIG. 16 is a view illustrating transition of an engine revolution speed and a water temperature in the DPF regeneration according to the fourth embodiment.

FIG. 16 is a view showing the transition of the engine revolution speed and the water temperature during the DPF regeneration carried out by the first operation, the second operation, and the third operation.

As shown at the time point T1 in FIG. 16, when the PM deposit amount reaches the predetermined amount or more, the first operation is performed by the regeneration controlling part 224a. At the time point T1, the warning device 226 prompts to increase the engine revolution speed. As the result, since the operator operates the setting member 227, the engine speed is increased. When the water temperature is increased by increasing the engine revolution speed and it reaches 65° C. or higher, the second operation is performed by the regeneration controlling part 224a as shown at the time point T2 in FIG. 16. That is, the intake air of the engine 18 is throttled. As the intake air of the engine 18 is throttled, the temperature of the exhaust gas rises, and when the temperature of the exhaust gas becomes 250° C. or more as shown at the time point T3 in FIG. 16, the third operation is performed by the regeneration control part 224a. When the post injection of the engine 18 is performed, the temperature of the exhaust gas becomes 600° C. or higher, and thereby the combustion of the particulate matter deposited in the DPF 221 is promoted.

In this manner, the regeneration controlling part 224a performs the operations relating to the regeneration in three stages of the first operation, the second operation, and the third operation in the DPF regeneration, and thereby the particulate matter deposited in the DPF 221 is reduced.

Meanwhile, it should be noted that it is preferable that the three-stage DPF regeneration described above is performed in a state where the wheel loader 1 is parked in a predetermined place. As shown in FIG. 15, a parking detecting device 229 configured to detect the parking is connected to the control device 224. The parking detecting device 229 is turned on when the parking lever (a parking brake) swingably supported by the machine body 2 is in a position (a braking position) for braking the machine body 2, and thus the parking detecting device 229 detects the parking. In addition, the parking detecting device 229 is turned off when the parking lever is in a position (a releasing position) for releasing the braking of the machine body 2, and thus the parking detecting device 229 does not detect the parking. The regeneration controlling part 224a executes the first operation when the parking is detected by the parking detecting device 229 under the situation where the PM deposit amount is equal to or larger than an amount requiring the DPF regeneration. In this manner, when the DPF regeneration is performed on the condition where the wheel loader 1 is parked at a predetermined place, it is possible to prevent the exhaust gas at the time of the DPF regeneration from directly blowing a substance weak in a high-temperature environment. For example, plants such as grasses, trees, construction materials, and the like are weak against the high temperature environments, and thus the DPF regeneration can be performed selectively at the places where there is no such weak substances.

Figure 17:
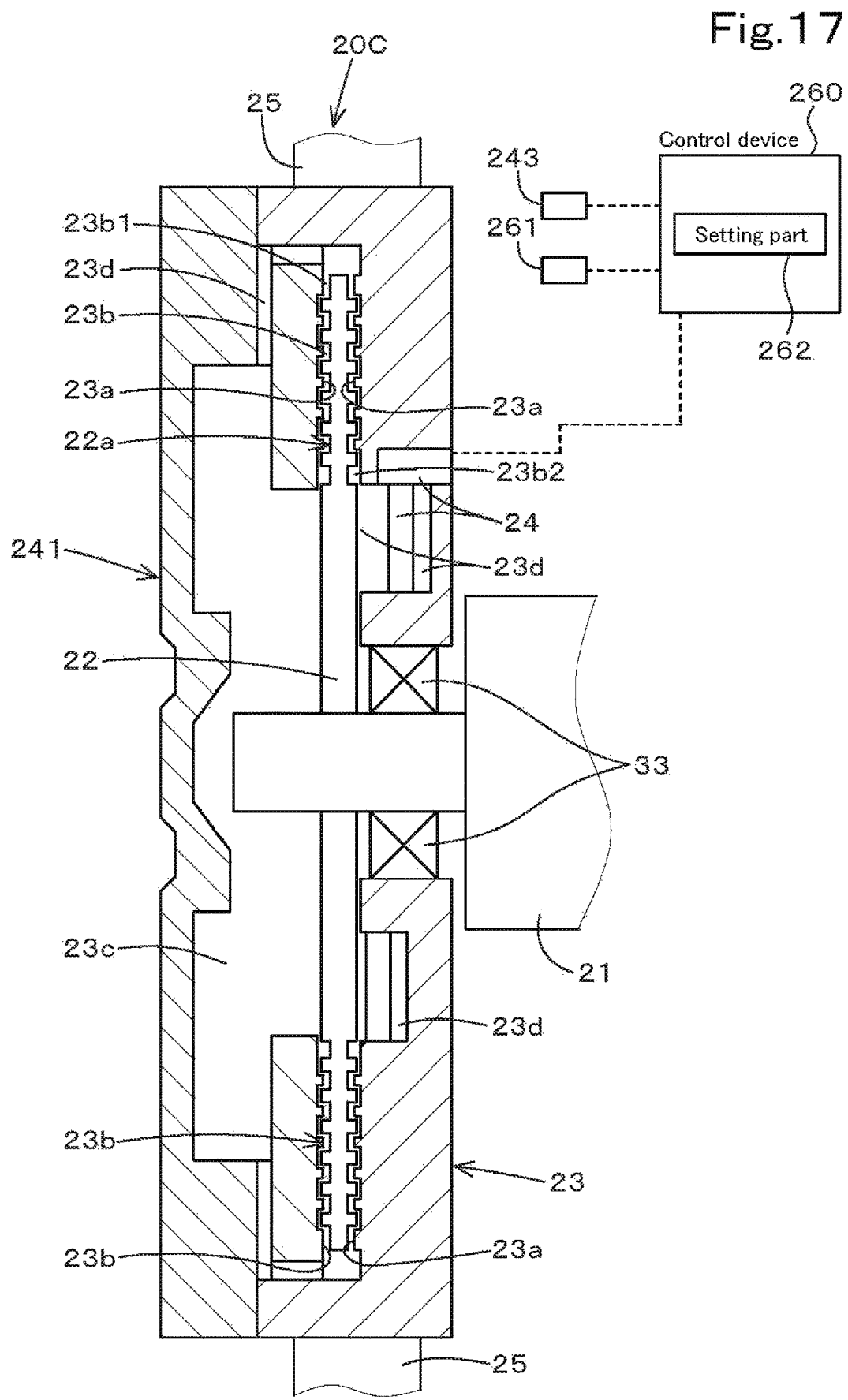
FIG. 17 is a view illustrating details of the cooling device.

As shown in FIG. 17, the wheel loader I includes a cooling device 20C.

The cooling device 20C is a device configured to drive the engine 18 as a power source, and is, for example, a viscous type clutch fan that employs a viscous fluid. In the case of the viscous type clutch fan, the viscous type clutch fan can be operated even in an environment where the outside air temperature or the like is very low, for example, -30° C.

The cooling device 20C includes a power transmission part 41 and a fan 42. The power transmission part 41 is a transmission device configured to receive the rotating power of the output shaft 19 of the engine 18, to convert the received rotating power (hereinafter may be referred to as a first rotating power) to the second rotating power, and then to output the converted rotating power to the fan 42. As shown in FIG. 17, the power transmission part 241 includes a rotating shaft 21, a rotor 22, a housing (a case) 23, and a fluid setting part (a fluid setting device) 24. Since the rotating shaft 21, the rotor 22, the housing 23, and the fluid setting portion (the fluid setting device) 24 have the same configurations as those of the above-described embodiments, and thus the descriptions thereof will be omitted. Even in the cooling device 20C, by increasing the amount of the silicon oil introduced into the gap 23b for example, the rotation speed of the fan 42 can be increased to be substantially the same with the revolution speed of the engine 18. That is, the first rotating power inputted to the power transmission part 241 (the rotating shaft 43) can be outputted to the fan 25 through the housing 23 as the second rotating power without being decreased.

In addition, by reducing the amount of the silicon oil introduced into the gap 23b, the torque transmitted from the rotating shaft 19 of the engine 18 to the housing 23 through the rotor 22 is reduced. That is, by reducing the amount of the silicon oil introduced into the gap 23b, the ratio of the rotation speed of the fan 25 is reduced with respect to the revolution speed of the engine 18. In other words, by reducing the amount of the silicon oil introduced into the gap 23b, the first rotating power inputted to the power transmission portion 241 (the rotating shaft 21) is lowered, and is transmitted as the second rotating power to the fan 25 through the housing 23.

Figure 18:
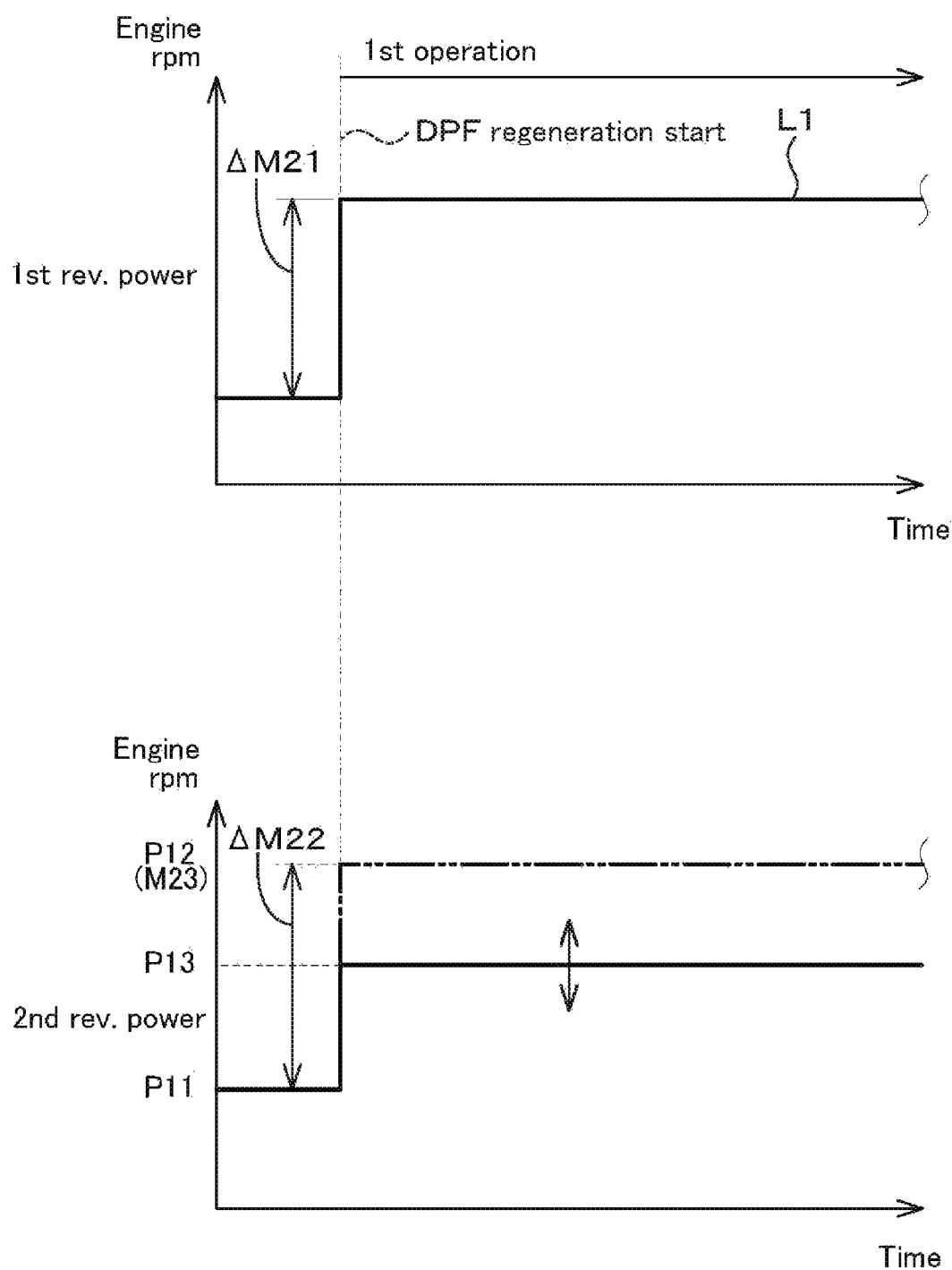
FIG. 18 is a view illustrating transition of the engine revolution speed and a rotation speed of a fan in the DPF regeneration according to the fourth embodiment.

The cooling device 20C changes the rotation speed of the fan 25 in the DPF regeneration performed by the exhaust gas purification device 200. FIG. 18 is a view showing the transition of the first rotating power (the engine revolution speed) and the second rotating power (the rotation speed of the fan). Since the rotating power can be substantially replaced by the rotation speed, the explanations will be made assuming that the rotating power is equivalent to the rotation speed, for convenience of the explanation.

As shown in FIG. 18, when the first operation of the DPF regeneration is performed for example, the engine revolution speed is increased. As shown by a line L1 in FIG. 18, the first rotating power inputted to the power transmission part 241 increases as the engine revolution speed increases, and thus the second rotating power (the rotation speed of the fan 25) is increased.

Then, the power transmission part 241 of the cooling device 20C reduces the first rotating power increased in the DPF regeneration in accordance with the increasing of the engine revolution speed, and transmits the reduced rotating power to the fan 25 as the second rotating power.

In particular, as shown in FIG. 18, the second rotating power (the rotation speed of the fan 25) before the DPF regeneration is defined as "a pre-regeneration power (a pre-regeneration revolution speed) P11", the second rotating power (the rotation speed of the fan 25) of the case where the first rotating power increased in the DPF regeneration is not reduced is defined as "a first post-regeneration power (a first post-regeneration revolution speed) P12", and the second rotating power (the rotation speed of the fan 25) of the case where the first rotating power increased in the DPF regeneration is reduced is defined as "a second post-regeneration power (a second post-regeneration revolution speed) P13". In that case, the power transmission part 241 sets the second post-regeneration revolution speed P13 is set so as to satisfy an order "P11<P13<P12".

In particular, the second post-regeneration revolution speed P13 is set by the control device 260 constituted of a CPU or the like. The control device 260 outputs a control signal to the fluid setting device 45 to change the aperture degree of the fluid setting device 45, and thereby controls the rotation speed of the fan 25. That is, the control device 260 controls the fluid setting device 45 such that the target rotation speed of the fan 25 and the actual rotation speed of the fan 25 are matched with each other.

The control device 260 is connected to the control device 224, and obtains information on the DPF regeneration from the control device 224. Hereinafter, for convenience of the explanation, the control device 260 is referred to as a first control device 260, and the control device 224 is referred to as a second control device 224.

As shown in FIG. 17, a rotating detecting device 261 is connected to the first control device 260. The rotating detecting device 261 is a device configured to detect the actual rotation speed of the fan 25 (the housing 23). That is, the rotating detecting device 261 is provided in the vicinity of the fan 25 or the housing 23, and detects the actual rotation speed of the fan 25. The first control device 260 includes a setting part 262. The setting part 262 is a portion configured to set the second post-regeneration revolution speed P13, and is constituted of electric/electronic parts constituting the first controlling part 260, a program incorporated in the first controlling part 260, or the like.

Hereinafter, the setting part 262 will be described with reference to FIG. 18

The setting part 262 sets the second post-regeneration revolution speed P13 to satisfy the order "P11<P13<P12". In particular, when the first control device 260 obtains a signal indicating the start of the DPF regeneration (the start of the first operation by the regeneration controlling part 224a), the setting part 262 retains the actual rotation speed of the fan 25 as the pre-regeneration revolution speed P11, the actual rotation speed of the fan 25 being detected by the rotating detecting device 261 immediately before the start of the DPF regeneration.

In addition, when the first control device 260 obtains the signal indicating the start of the DPF regeneration, the setting part 262 monitors the target revolution speed of the engine after the start of the DPF regeneration. When the target revolution speed of the engine is rapidly increased, the setting part 262 obtains an increased amount ΔM21 of the increased target revolution speed of the engine, and estimates the increased amount ΔM22 of the actual rotating number of the fan 25 on the basis of the increased amount ΔM21 of the target revolution speed of the engine. For example, the setting part 262 multiplies the increased amount ΔM21 of the target revolution speed of the engine by a predetermined coefficient, and thereby estimates the increased amount ΔM22 of the actual rotating number of the fan 25 (hereinafter referred to as the estimated increased amount ΔM22).

In addition, the setting part 262 estimates 25 the actual rotation speeds of the fan 25 (hereinafter, referred to as an estimated rotation speed M23) on the basis of the pre-regeneration revolution speed P11 and the estimated increased amount ΔM22, the actual rotation speeds of the fan 25 being obtained in the case where the engine revolution speed is increased. That is, the setting part 262 obtains the estimated rotation speed M23 in accordance with an equation "the estimated rotation speed M23=the pre-regeneration revolution speed P11+the estimated increase amount ΔM22". The setting part 262 sets the estimated rotation speed M23 to the first post-regeneration revolution speed P12. Then, during the DPF regeneration, the setting part 262 sets the second post-regeneration revolution speed P13 to be higher than the pre-regeneration revolution speed P11 and less than the first post-regeneration revolution speed P12 (sets so as to satisfy the order "P11<P13<P12"). That is, the setting part 262 sets the target rotation speed of the fan 25 in the DPF regeneration to the value indicated by the second post-regeneration revolution speed P13. As described above, it is preferred that the value of the second post-regeneration revolution speed P13 is set based on the water temperature measured by the measuring device 228 It is preferable to set it, in setting the second post-regeneration revolution speed P13 (the target rotation speed of the fan 25) so as to satisfy the order "P11<P13<P12". In other words, it is preferable to set the decreased amount of the first rotating power on the basis of the water temperature. For example, in the case where the water temperature after the start of the DPF regeneration is close to 65° C. that is a threshold value for the second operation (for example, within 5° C.), the setting part 262 decreases the decreased amount of the first rotating power, that is, decreases a difference between the pre-regeneration revolution speed P11 and the second post-regeneration revolution speed P13. On the other hand, in the case where the water temperature after the start of the DPF regeneration is far from 65° C. (for example, 30° C.), the difference between the pre-regeneration revolution speed P11 and the second post-regeneration revolution speed P13 is increased.

In the first control device 260, the difference between the pre-regeneration revolution speed P11 and the second post-regeneration revolution speed P13 (the decreased amount of the first rotating power) is set based on the water temperature measured by the measuring device 228. Thus, in the first operation of the DPF regeneration, the water temperature can be increased to 65° C. or more as soon as possible.

In the above-described embodiments, the operator increases the engine speed by manually operating the setting member 227 in the DPF regeneration. However, the engine speed may be increased by switching the switch. In particular, as shown in FIG. 15, a regeneration switch 263 is connected to the control device 224. The regeneration switch 263 is a switch configured to be switched between ON and OFF manually. When the regeneration switch 263 is ON, the control device 224 outputs a command for regeneration (hereinafter referred to as a regeneration command) to the control device 224. When the regeneration switch 263 is OFF, the regeneration command is stopped. When the PM deposit amount reaches a predetermined amount or more, the regeneration switch 263 enters a state where the regeneration switch 263 can receive the input. When the operator turns the regeneration switch 263 on and a regeneration command is input to the control device 224, the regeneration controlling part 224a automatically performs an operation (a first operation) to increase the engine speed. Also in that case, as described above, the setting part 262 of the first control device 260 obtains the second post-regeneration revolution speed P13 and decreases the rotation speed of the fan 25 to be less than the rotation speed obtained before the DPF regeneration.

According to the above embodiments, in the case where the engine revolution speed is increased for performing the DPF regeneration, the rotation speed of the fan 25 is increased as the engine revolution speed increases. However, since the rotation speed of the fan 25 is suppressed, it is possible to prevent the cooling operation of the fan 25 from hindering the temperature increasing in the DPF regeneration. That is, even when a fan configured to be rotated by the power of the engine is provided, it is possible for the exhaust gas purification device to appropriately regenerate the filter.

The working machine described above includes the exhaust gas purification device 200, the power transmission part 241 configured to receive the rotating power of the output shaft of the engine 18 and to change the first rotating power to the second rotating power, the first rotating power being the inputted rotating power, and the fan 25 configured to be rotated by the second rotating power outputted from the power transmission part 241. The power transmission part 241 reduces the first rotating power increased in accordance with the increasing of the revolution speed of the engine 18 during the regeneration of the filter 221, and transmits the reduced rotating power to the fan as the second rotating power.

The working machine further includes the measuring device 228 configured to measure the temperature of the cooling water of the engine 18. The power transmission part 241 sets the decreased amount of the first rotating power on the basis of the temperature of the cooling water measured by the measuring device.

The working machine further includes a regeneration switch 263 configured to manually issue a command to regenerate the filter 221. The regeneration controlling part 224a controls the engine 18 when a regeneration command is issued by the regeneration switch 263, and thereby regenerates the filter 221.

In addition, the work machine includes a parking detecting device 229 for detecting the parking and a setting member 227 for setting the revolution speed of the engine 18. When the parking detecting device 229 detects the parking, the regeneration controlling part 224a increases the revolution speed of the engine 18 in accordance with the revolution speed of the engine 18 set by the setting member 227, and thereby regenerates the filter 221.

In addition, the power transmission part 241 includes the housing to which the fan 25 is attached, the rotor 22 configured to re rotated by the rotating power of the output shaft of the engine 18 and to be rotated by the fluid together with the housing, the fluid being introduced into the gap 23b formed between the housing 23 and the rotor 22, and the fluid setting part 24 configured to set the introduction amount of the fluid to be introduced into the gap.

Moreover, the working machine further includes the exhaust gas purification device 200 having the filter 221 for catching the particulate matter contained in the exhaust gas exhausted from the engine 18, the regeneration controlling part 224a configured to issue a command to the engine 18 and thereby to regenerate the filter 221, and a fan 25 configured to be rotated by the rotating power of the output shaft of the engine 18 and to change the rotation speed during the regeneration of the filter 221.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims. In the embodiments described above, the first control device 260 and the second control device 224 are configured separately. However, instead of that, the first control device 260 and the second control device 224 may be configured integrally.

What is claimed is:

1. A cooling control system for a working machine, comprising:
   a fan;
   a housing to which the fan is attached;
   a prime mover having an output shaft;
   a rotor to be rotated together with the housing by a rotating power of the output shaft through a fluid introduced to a gap formed between the housing and the rotor;
   a fluid regulator to regulate an amount of the fluid introduced to the gap; and
   a controller configured to be controlled by a program to control the fluid regulator to regulate the actual rotation speed of the fan to be matched with a target rotation speed of the fan,
   wherein the program causes the controller to,
      calculate a target rotation speed (F1=E1 −D) of the fan by subtracting a predetermined speed (D) from an actual rotation speed (E1) of the prime mover
      perform a proportional control for the actual rotation speed (F2) of the fan based upon a difference (=F1−F2) between the target rotation speed of the fan and the actual rotation speed of the fan,
      perform an integral control for the actual rotation speed (F2) of the fan based upon the difference (=F1−F2),
      perform a differential control for the actual rotation speed (F2) of the fan based upon the difference (=F1−F2), and
      selectively deactivate one or two of the proportional control step, the integral control step, and the differential control step in accordance with the actual rotation speed of the prime mover.

2. A working machine, comprising:
   the cooling control system according to claim 1.

3. The cooling control system according to claim 1, wherein the program causes the controller to deactivate, in the selectively deactivating step, the integral control step and the differential control step until the actual rotation speed of the prime mover reaches a predetermined rotation speed after starting the prime mover.

4. The cooling control system according to claim 1, wherein the program causes the controller to deactivate, in the selectively deactivating step, the integral control step and the differential control step when a first speed gap between the actual rotation speed of the prime mover and the actual rotation speed of the fan is kept less than a first threshold speed and then the actual rotation speed of the prime mover is increased.

5. The cooling control system according to claim 1, wherein the program causes the controller to deactivate, in the selectively deactivating step, the integral control step after the actual rotation speed of the prime mover is decreased so that a second speed gap between the actual rotation speed of the prime mover and the actual rotation speed of the fan is kept less than a second threshold speed.

6. A cooling control system for a working machine, comprising:
   a prime mover having an output shaft;
   a fan to be rotated by a rotating force of the output shaft;
   a first detector to detect an actual rotation speed of the prime mover;
   a second detector to detect an actual rotation speed of the fan; and a controller controlled by a program to:
perform a proportional control for the actual rotation speed of the fan based on of a difference between the actual rotation speed of the fan and a target rotation speed of the fan;
perform an integral control for the actual rotation speed of the fan based on the difference;
perform a differential control for the actual rotation speed of the fan based on the difference; and
selectively deactivate one or two of the proportional control step, the integral control step, and the differential control step based on a state of either one of the prime mover and the fan.

7. The cooling control system according to claim 6, wherein the program causes the controller to deactivate, in the selectively deactivating step, the integral control step and the differential control step at a time of starting the prime mover.

8. The cooling control system according to claim 7, wherein the program causes the controller to deactivate, in the selectively deactivating step, the integral control step and the differential control step when the actual rotation speed of the fan is higher than a threshold value, the threshold value being a difference between the actual rotation speed of the prime mover and a predetermined rotation speed.

9. The cooling control system according to claim 7, wherein, in the selectively deactivating step, the program causes the controller to deactivate, at the time of starting the prime mover, the integral control step and differential control step when the actual rotation speed of the fan is higher than a threshold value, the threshold value being a difference between the actual rotation speed of the prime mover and a predetermined rotation speed, and to activate the integral control step and the differential control step when the actual rotation speed of the fan is equal to or less than the threshold value.

10. The cooling control system according to claim 7, wherein, in the selectively deactivating step, the program causes the controller to deactivate the integral control step when the target rotation speed of the fan is changed by a predetermined speed or more.

11. The cooling control system according to claim 7, further comprising:
a housing to which the fan is attached;
a rotor to be rotated together with the housing by a rotating power of the output shaft through a fluid introduced to a gap formed between the housing and the rotor; and
a fluid regulator to regulate an amount of the fluid introduced to the gap.

12. A cooling control system for a working machine, comprising:
a prime mover having an output shaft;
a fan to be rotated by a rotating force of the output shaft;
a second detector to detect an actual rotation speed of the fan;
a controller configured to be controlled by a program to,
generate an interpolation-trajectory based on a target rotation speed of the fan and a polynomial interpolation equation, the interpolation-trajectory extending from the actual rotation speed to the target rotation speed of the fan; and
control an actual rotation speed of the fan based on the generated interpolation-trajectory until the actual rotation speed of the fan reaches the target rotation speed of the fan.

13. The cooling control system according to claim 12, wherein the program causes the controller to control the actual rotation speed of the fan based on a difference between the actual rotation speed of the fan and a rotation speed of the fan obtained from the generated interpolation trajectory in a predetermined time.

14. The cooling control system according to claim 13, wherein the program causes the controller to:
perform a proportional control of the difference;
perform an integral control of the difference; and
perform a differential control of the difference.

15. The cooling control system according to claim 12, wherein, in the interpolation-trajectory generating step, the controller sets a decreasing interpolation trajectory in changing a rotating direction of the fan from a direction of the normal rotation to a direction of the inverse rotation, the decreasing interpolation trajectory being the interpolation trajectory that decreases the rotation speed of normal rotation of the fan,
and wherein the program causes the controller to control the actual rotation speed of the fan based on the decreasing interpolation trajectory.

16. The cooling control system according to claim 15, wherein program causes the controller to set an increasing interpolation trajectory in a case where the rotation speed of the inverse rotation of the fan is increased after the actual rotation speed of the fan is decreased based on the decreasing interpolation trajectory, the increasing interpolation trajectory being the interpolation trajectory that increases the rotation speed of the inverse rotation of the fan,
and wherein the program causes controller to control the actual rotation speed of the fan based on the increasing interpolation trajectory.

17. The cooling control system according to claim 12 further comprising:
a housing to which the fan is attached;
a rotor to be rotated together with the housing by a rotating power of the output shaft through a fluid introduced to a gap formed between the housing and the rotor; and
a fluid regulator to regulate an amount of the fluid introduced to the gap.

18. The cooling control system for a working machine according to claim 12, wherein the prime mover includes an electric motor.

19. A cooling control system for a working machine, comprising:
a fan;
a housing to which the fan is attached;
a prime mover having an output shaft;
a rotor to be rotated together with the housing by a rotating power of the output shaft through a fluid introduced to a gap formed between the housing and the rotor;
a fluid regulator to regulate an amount of the fluid introduced to the gap; and
a controller configured to be controlled by a program to control the fluid regulator to regulate the actual rotation speed of the fan to be matched with a target rotation speed of the fan,
wherein the program causes the controller to,
calculate a target rotation speed of the fan by subtracting a predetermined speed from an actual rotation speed of the prime mover, perform a proportional control for the actual rotation speed of the fan based upon a difference between the target rotation speed of the fan and the actual rotation speed of the fan, perform an integral control for the actual rotation speed of the fan based upon the difference, perform a differential control for the actual rotation speed of the fan based upon the difference, and selectively deactivate one or two of the proportional control, the integral control, and differential control in accordance with the actual rotation speed of the prime mover.

20. The cooling control system according to claim 19, wherein the program causes the controller to deactivate the integral control and the differential control until the actual rotation speed of the prime mover reaches a predetermined rotation speed after starting the prime mover.

21. The cooling control system according to claim 19, wherein the program causes the controller to deactivate the integral control and differential control when a first speed gap between the actual rotation speed of the prime mover and the actual rotation speed of the fan is kept less than a first threshold speed and then the actual rotation speed of the prime mover is increased.

22. The cooling control system according to claim 19, wherein the program causes the controller to deactivate the integral control after the actual rotation speed of the prime mover is decreased so that a second speed gap between the actual rotation speed of the prime mover and the actual rotation speed of the fan is kept less than a second threshold speed.

23. A working machine, comprising:
the cooling control system according to claim 19.

* * * * *